(12) United States Patent
Song et al.

(10) Patent No.: US 10,643,472 B2
(45) Date of Patent: May 5, 2020

(54) MONITOR APPARATUS AND MONITOR SYSTEM

(71) Applicant: KABUSHIKI KAISHA TOSHIBA, Tokyo (JP)

(72) Inventors: Yan Song, Kanagawa (JP); Manabu Nishiyama, Tokyo (JP); Tomoki Watanabe, Tokyo (JP); Masahiro Sekine, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/444,751

(22) Filed: Feb. 28, 2017

(65) Prior Publication Data
US 2017/0347066 A1    Nov. 30, 2017

(30) Foreign Application Priority Data

May 31, 2016   (JP) ................................ 2016-108915

(51) Int. Cl.
*G08G 1/16* (2006.01)
*G06K 9/00* (2006.01)
(Continued)

(52) U.S. Cl.
CPC ......... *G08G 1/166* (2013.01); *G06K 9/00369* (2013.01); *G06K 9/00771* (2013.01);
(Continued)

(58) Field of Classification Search
CPC ........... G05B 2219/40339; G05B 2219/40317; G05B 2219/39082; G05B 2219/40476; G05B 2219/39091; G05B 2219/40201
See application file for complete search history.

(56) References Cited

U.S. PATENT DOCUMENTS 8,798,885 B2 *   8/2014  Tsuchida ............. B60R 21/0134
                                                                    701/301
8,903,636 B1 *  12/2014  Al Kandari .......... G08G 1/0145
                                                                    701/118
(Continued)

FOREIGN PATENT DOCUMENTS

JP   2008-160496   7/2008
JP   2010-176302   8/2010
(Continued)

OTHER PUBLICATIONS

English-language machine-translation of JP2010-277420.

*Primary Examiner* — Ricky Chin
(74) *Attorney, Agent, or Firm* — Nixon & Vanderhye, P.C.

(57) ABSTRACT

According to one embodiment, a monitor apparatus includes a memory and processing circuitry. The processing circuitry acquires first information indicating a position and a moving direction of a target, acquires second information indicating a position of each of moving objects and sensors which are provided in the moving objects, selects at least one of a first moving object for monitoring the target from among the moving objects or a first sensor for monitoring the target from among the sensors, based on the first information and the second information, and transmits third information indicating the target and at least one of the first moving object or the first sensor.

17 Claims, 18 Drawing Sheets

(51) Int. Cl.
  *G06T 7/292* (2017.01)
  *G06K 9/32* (2006.01)
  *G06T 7/70* (2017.01)
  *H04N 7/18* (2006.01)

(52) U.S. Cl.
  CPC ..... *G06K 9/00785* (2013.01); *G06K 9/00993* (2013.01); *G06K 9/3241* (2013.01); *G06T 7/292* (2017.01); *G06T 7/70* (2017.01); *G08G 1/167* (2013.01); *G08G 1/168* (2013.01); *H04N 7/181* (2013.01); *G05B 2219/40201* (2013.01); *G05B 2219/40317* (2013.01); *G05B 2219/40339* (2013.01); *G05B 2219/40476* (2013.01); *G06T 2207/10016* (2013.01); *G06T 2207/30196* (2013.01); *G06T 2207/30232* (2013.01); *G06T 2207/30236* (2013.01); *G06T 2207/30241* (2013.01)

(56) References Cited

U.S. PATENT DOCUMENTS

| | | | | |
|---|---|---|---|---|
| 9,478,129 | B1* | 10/2016 | Kothari | G08G 1/087 |
| 10,029,613 | B2* | 7/2018 | Chollet | G08G 1/164 |
| 2007/0200727 | A1* | 8/2007 | Sakamoto | H04H 60/80 |
| | | | | 340/4.42 |
| 2008/0165252 | A1 | 7/2008 | Kamimura | |
| 2008/0258890 | A1* | 10/2008 | Follmer | B60R 25/102 |
| | | | | 340/439 |
| 2008/0281926 | A1* | 11/2008 | Walter | H04N 7/163 |
| | | | | 709/206 |
| 2008/0288162 | A1* | 11/2008 | Theimer | G08G 1/164 |
| | | | | 701/117 |
| 2010/0156669 | A1* | 6/2010 | Kim | G08G 1/01 |
| | | | | 340/917 |
| 2010/0253597 | A1* | 10/2010 | Seder | B60R 1/00 |
| | | | | 345/7 |
| 2011/0121995 | A1* | 5/2011 | Zettergren | G08G 1/042 |
| | | | | 340/933 |
| 2011/0210866 | A1* | 9/2011 | David | G08G 1/163 |
| | | | | 340/903 |
| 2014/0075465 | A1* | 3/2014 | Petrovic | H04N 21/252 |
| | | | | 725/14 |
| 2014/0309789 | A1* | 10/2014 | Ricci | H04W 4/40 |
| | | | | 700/276 |
| 2015/0109149 | A1* | 4/2015 | Duncan | G08G 1/005 |
| | | | | 340/944 |
| 2015/0279194 | A1* | 10/2015 | Tseng | G08B 21/182 |
| | | | | 340/458 |
| 2015/0307108 | A1* | 10/2015 | Chollet | G08G 1/164 |
| | | | | 348/149 |
| 2015/0339589 | A1* | 11/2015 | Fisher | B25J 9/16 |
| | | | | 706/12 |
| 2016/0150070 | A1* | 5/2016 | Goren | H04W 4/029 |
| | | | | 455/404.2 |
| 2016/0275360 | A1* | 9/2016 | Kang | G06K 9/00812 |
| 2016/0275404 | A1* | 9/2016 | Abraham | G08G 1/0967 |
| 2017/0025000 | A1* | 1/2017 | Lagassey | B64C 37/02 |
| 2017/0084172 | A1* | 3/2017 | Rolle | G08G 1/095 |
| 2017/0101056 | A1* | 4/2017 | Park | B60Q 9/008 |
| 2017/0336218 | A1* | 11/2017 | Beaurepaire | G01C 21/3415 |
| 2018/0048743 | A1* | 2/2018 | Misra | H04N 21/23892 |
| 2018/0075747 | A1* | 3/2018 | Pahwa | B60W 40/09 |
| 2018/0101998 | A1* | 4/2018 | Pierce | G06F 15/00 |
| 2018/0108252 | A1* | 4/2018 | Pividori | G07C 5/008 |
| 2018/0118223 | A1* | 5/2018 | Mori | B60W 40/09 |
| 2018/0151072 | A1* | 5/2018 | Altinger | G08G 1/04 |
| 2018/0211529 | A1* | 7/2018 | Kaur | G08G 1/0112 |

FOREIGN PATENT DOCUMENTS

| | | |
|---|---|---|
| JP | 2010-277420 | 12/2010 |
| JP | 2014-191664 | 10/2014 |
| JP | 2015-014916 | 1/2015 |
| JP | 5686435 | 3/2015 |

* cited by examiner

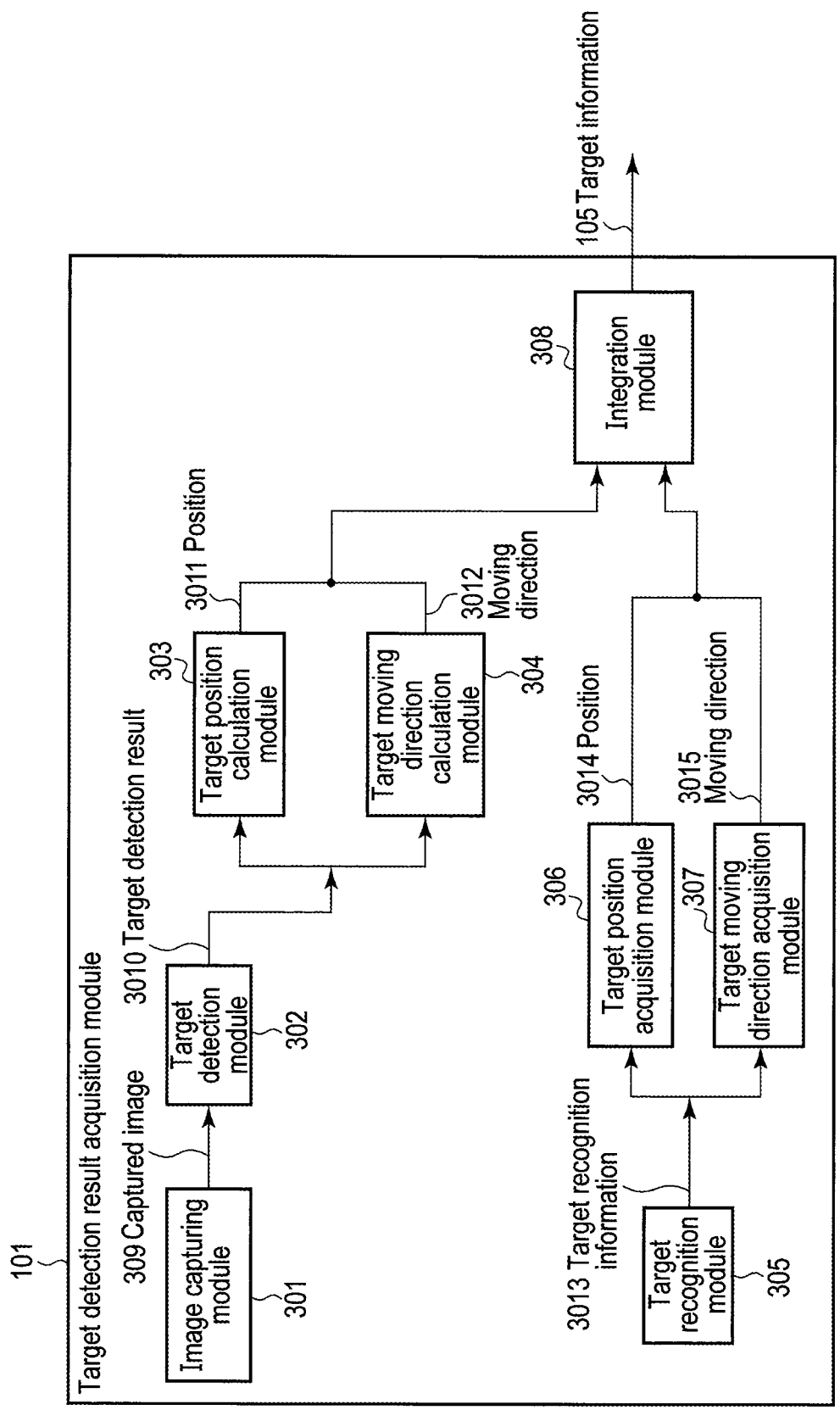
F I G. 4

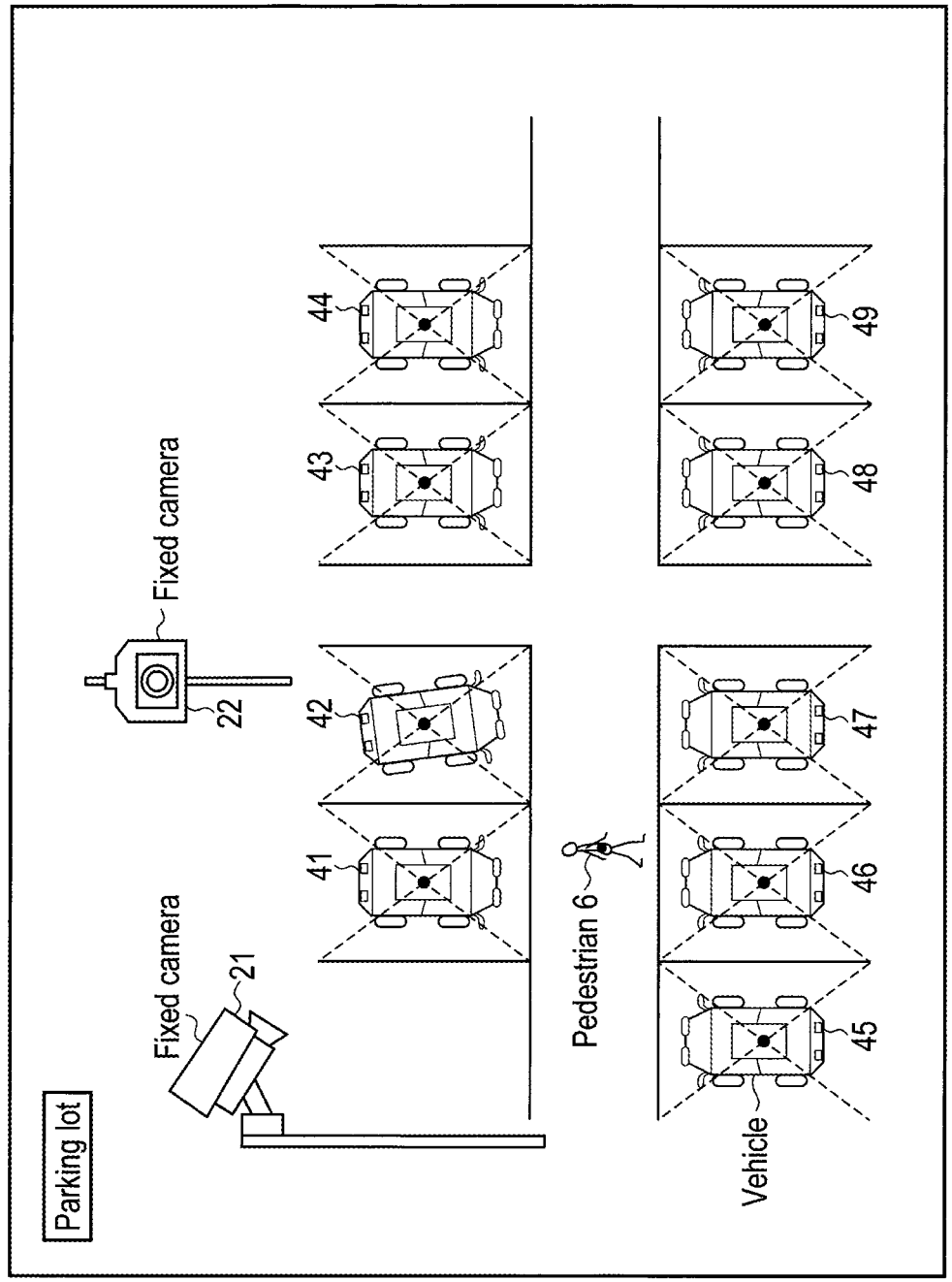
F I G. 8

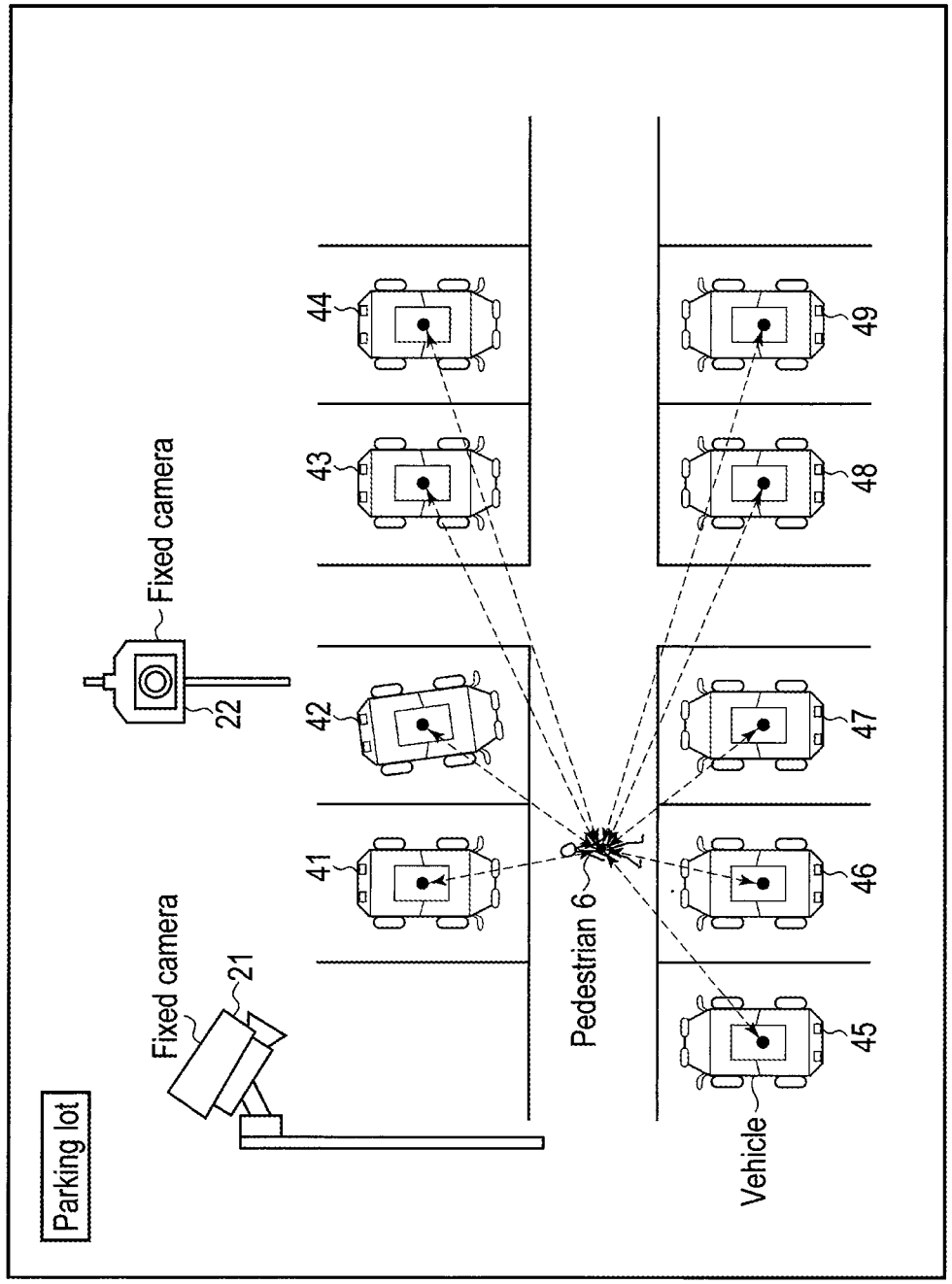
F I G. 9

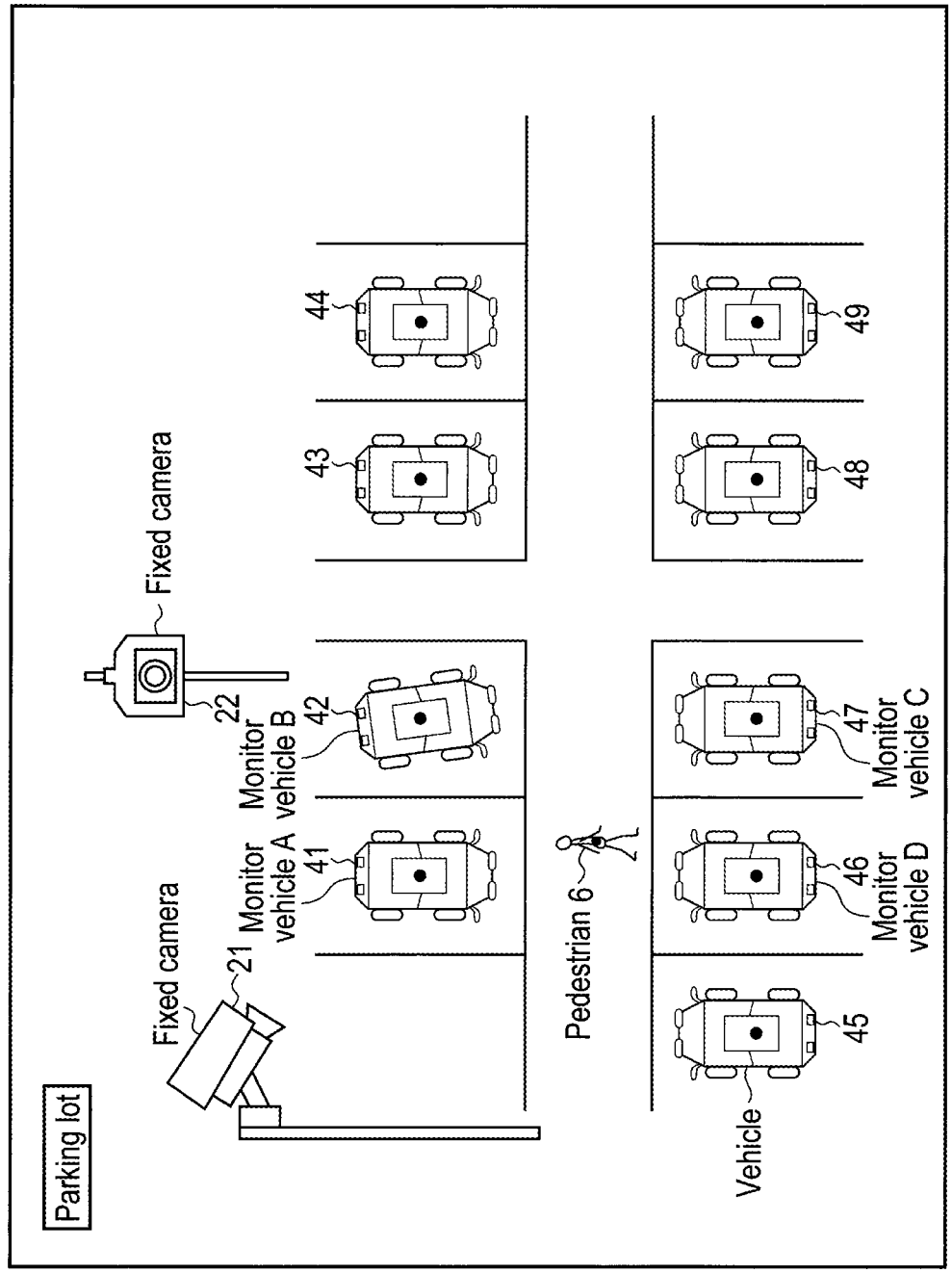
F I G. 10

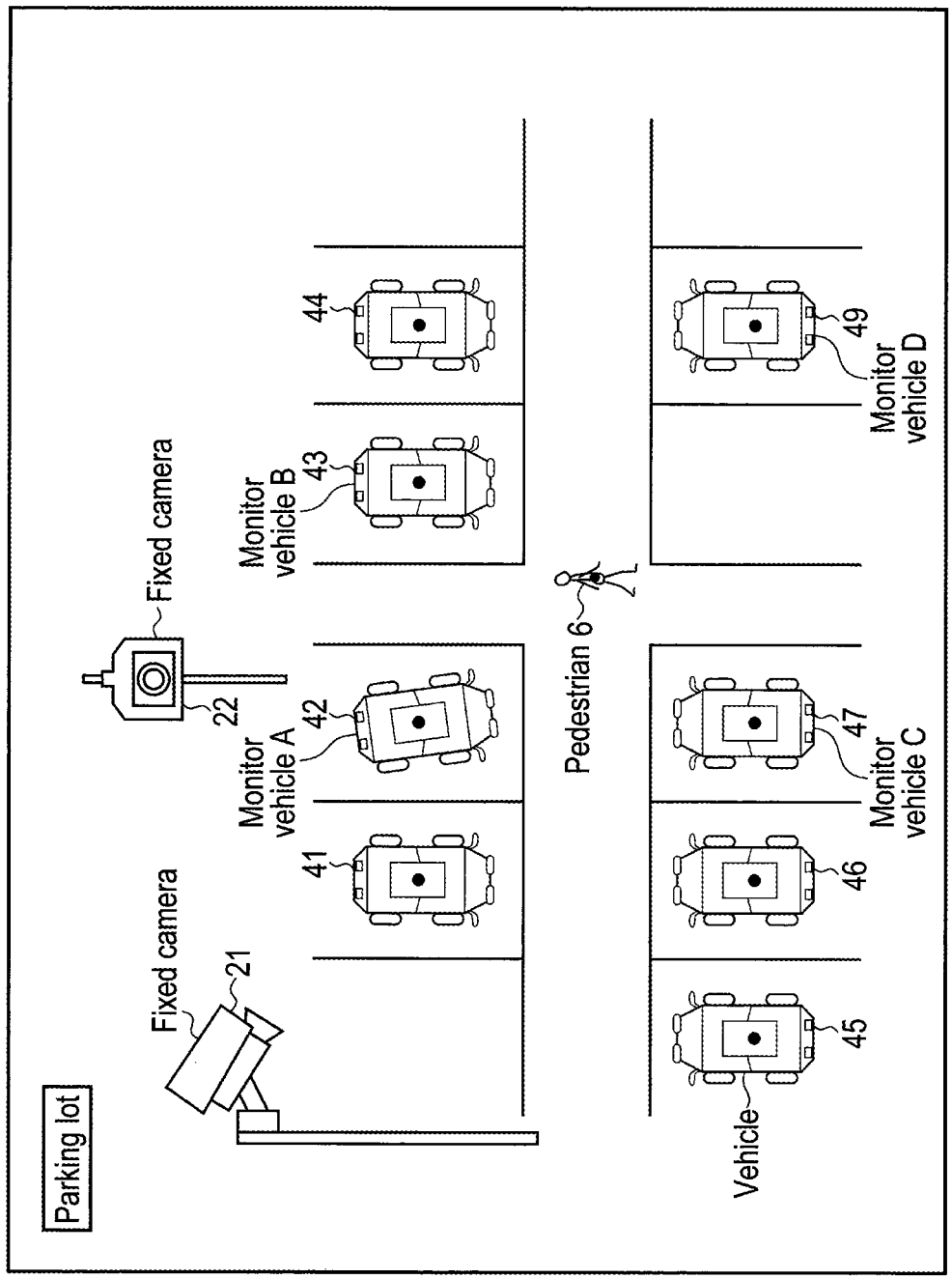
F I G. 12

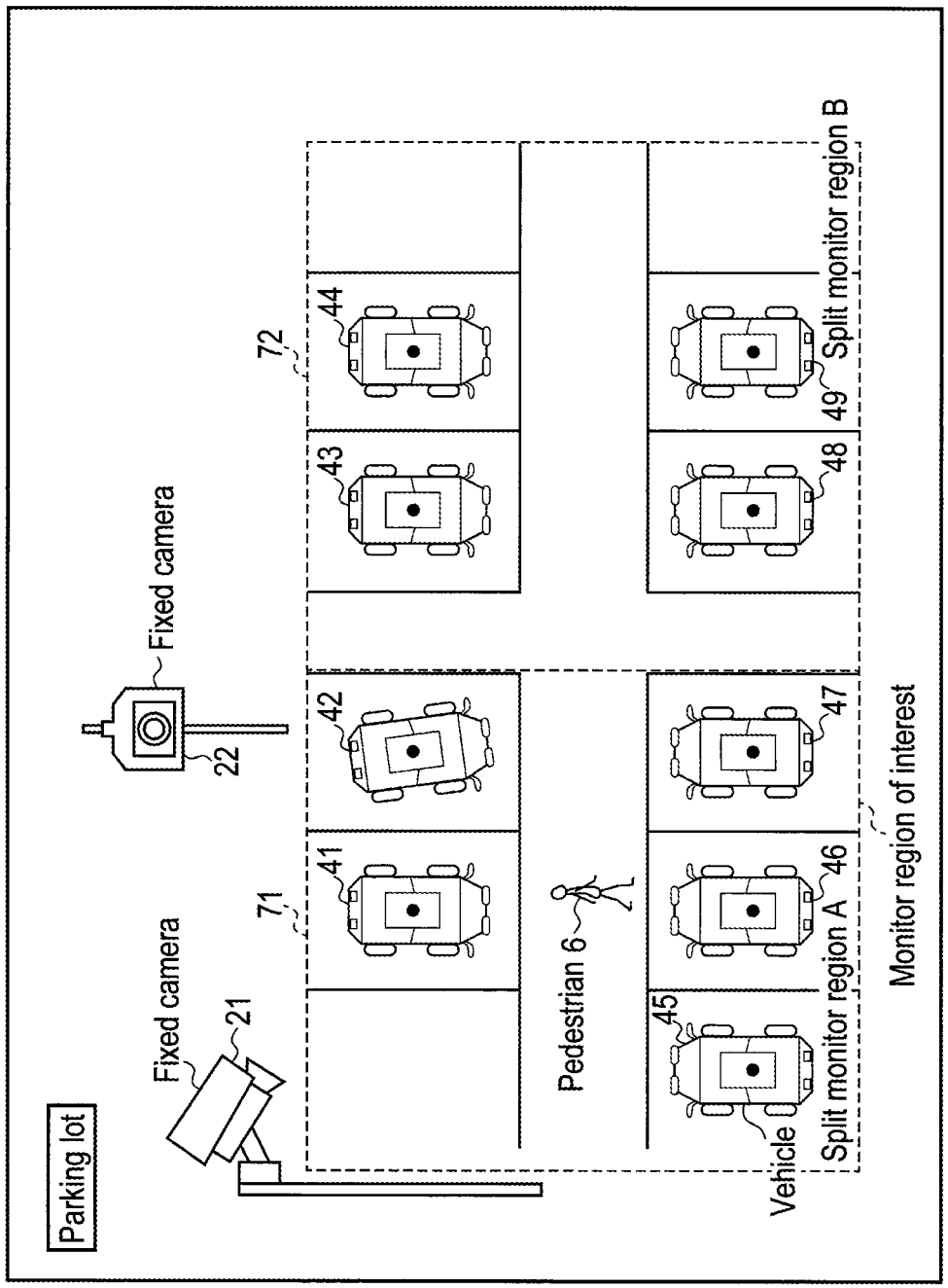
F I G. 13

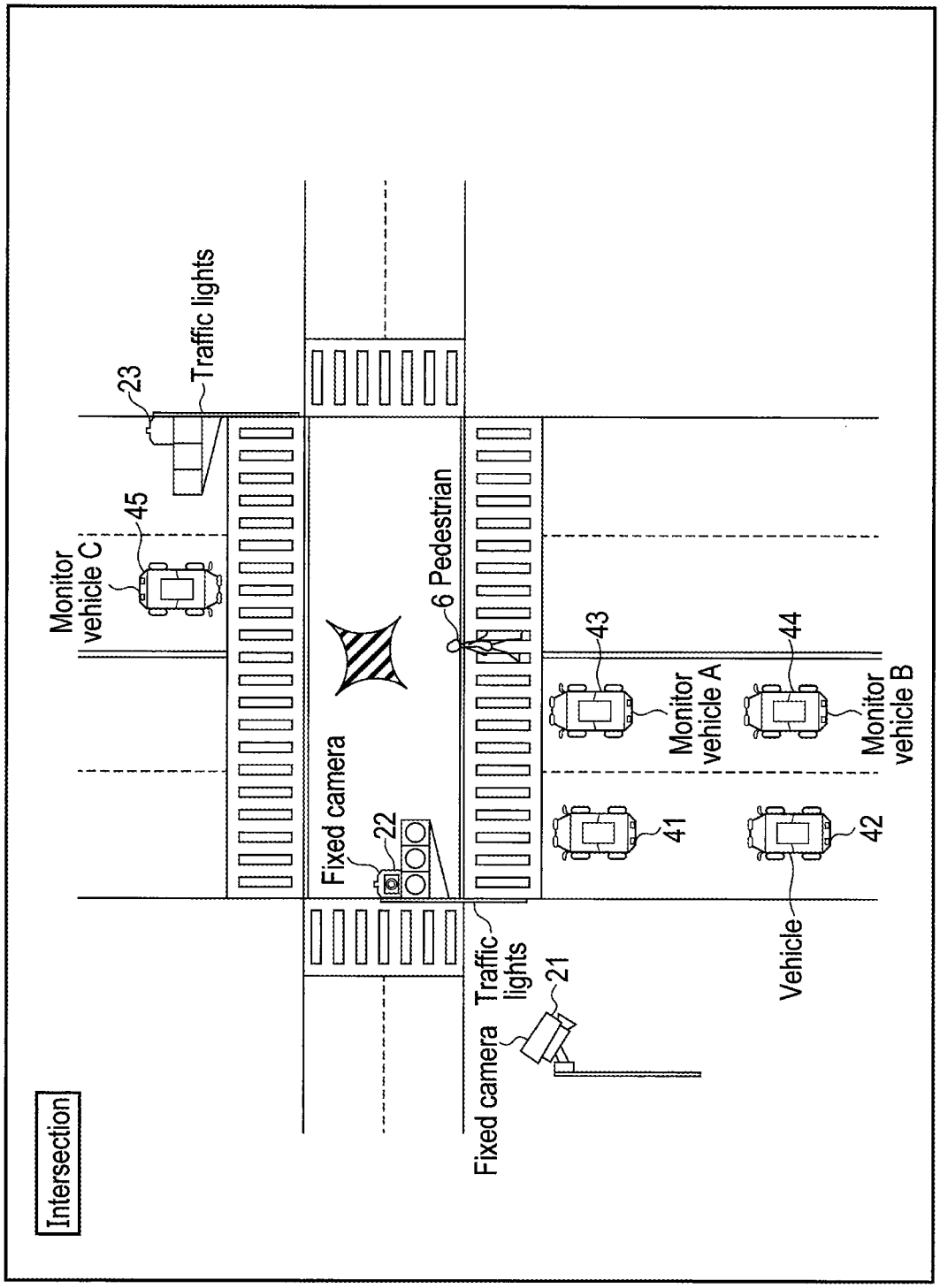
F I G. 16

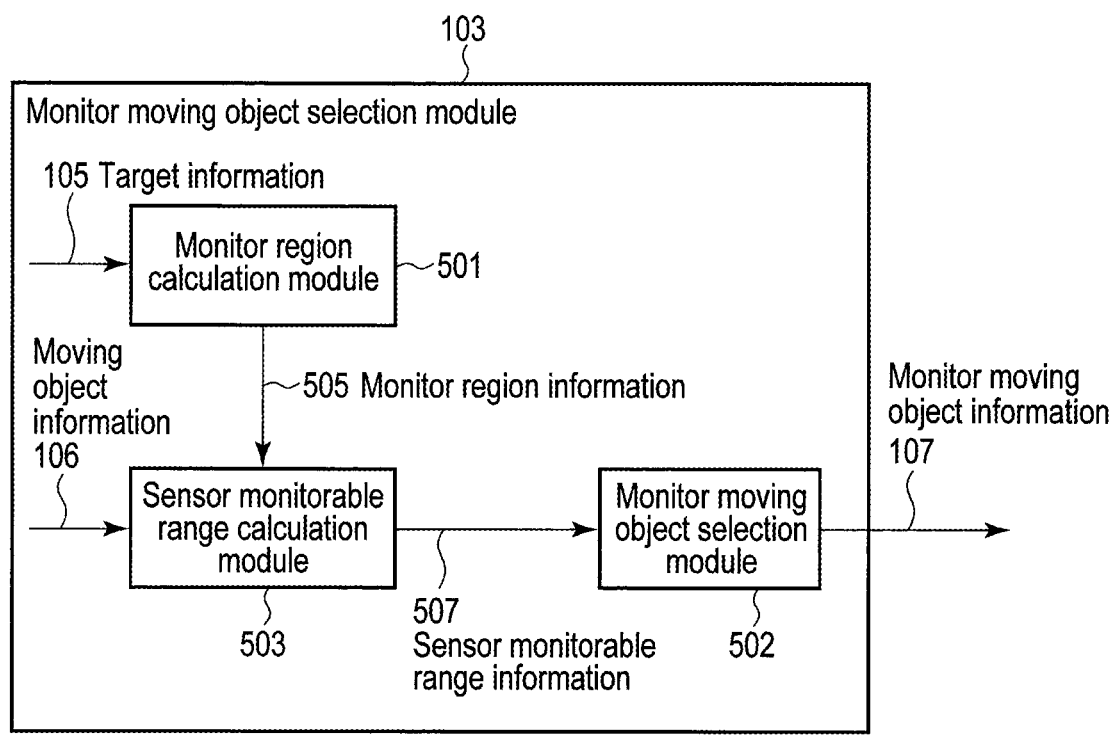
F I G. 20

MONITOR APPARATUS AND MONITOR SYSTEM

CROSS-REFERENCE TO RELATED APPLICATIONS

This application is based upon and claims the benefit of priority from Japanese Patent Application No. 2016-108915, filed May 31, 2016, the entire contents of which are incorporated herein by reference.

FIELD

Embodiments described herein relate generally to a technique for monitoring a moving target.

BACKGROUND

Various systems have been used to monitor a moving target by using camera. One of such systems includes a system that uses fixed cameras, each of which is defined with a region that can be monitored. In this system, in view of the moving direction of the moving target, the camera used for monitoring and the monitor mode of each camera are switched, so that the moving target can be monitored.

However, in a system using such a fixed camera, it may be impossible to monitor the moving target sufficiently in an environment where the blind spot dynamically changes.

BRIEF DESCRIPTION OF THE DRAWINGS

FIG. 4 is an exemplary block diagram showing a configuration of a target detection result acquisition module in the monitor apparatus of the embodiment.

FIG. 8 is a diagram showing an example in which the positions of a vehicle and a pedestrian are determined in the monitor region of FIG. 7.

FIG. 9 is a diagram showing an example in which the distance between the vehicle and the pedestrian is calculated in the monitor region of FIG. 7.

FIG. 10 is a view showing an example in which a monitor moving object for monitoring a pedestrian is selected in the monitor region of FIG. 7.

FIG. 12 is a view showing still another example in which a monitor moving object for monitoring a pedestrian is selected in the monitor region of FIG. 7.

FIG. 13 is a diagram showing an example in which a split monitor region which is a part of the monitor region of FIG. 7 is used as a monitor region of interest.

FIG. 16 is a diagram for explaining an example of an environment monitored by the monitor apparatus of the embodiment, in which a monitor region is an intersection, and a target is a pedestrian crossing a road at a crosswalk.

FIG. 20 is an exemplary block diagram showing another configuration of a monitor moving object selection module in the monitor apparatus of the embodiment.

DETAILED DESCRIPTION

In general, according to one embodiment, a monitor apparatus includes a memory and processing circuitry. The processing circuitry acquires first information indicating a position and a moving direction of a target, acquires second information indicating a position of each of moving objects and sensors which are provided in the moving objects, selects at least one of a first moving object for monitoring the target from among the moving objects or a first sensor for monitoring the target from among the sensors, based on the first information and the second information, and transmits third information indicating the target and at least one of the first moving object or the first sensor.

Figure 1:
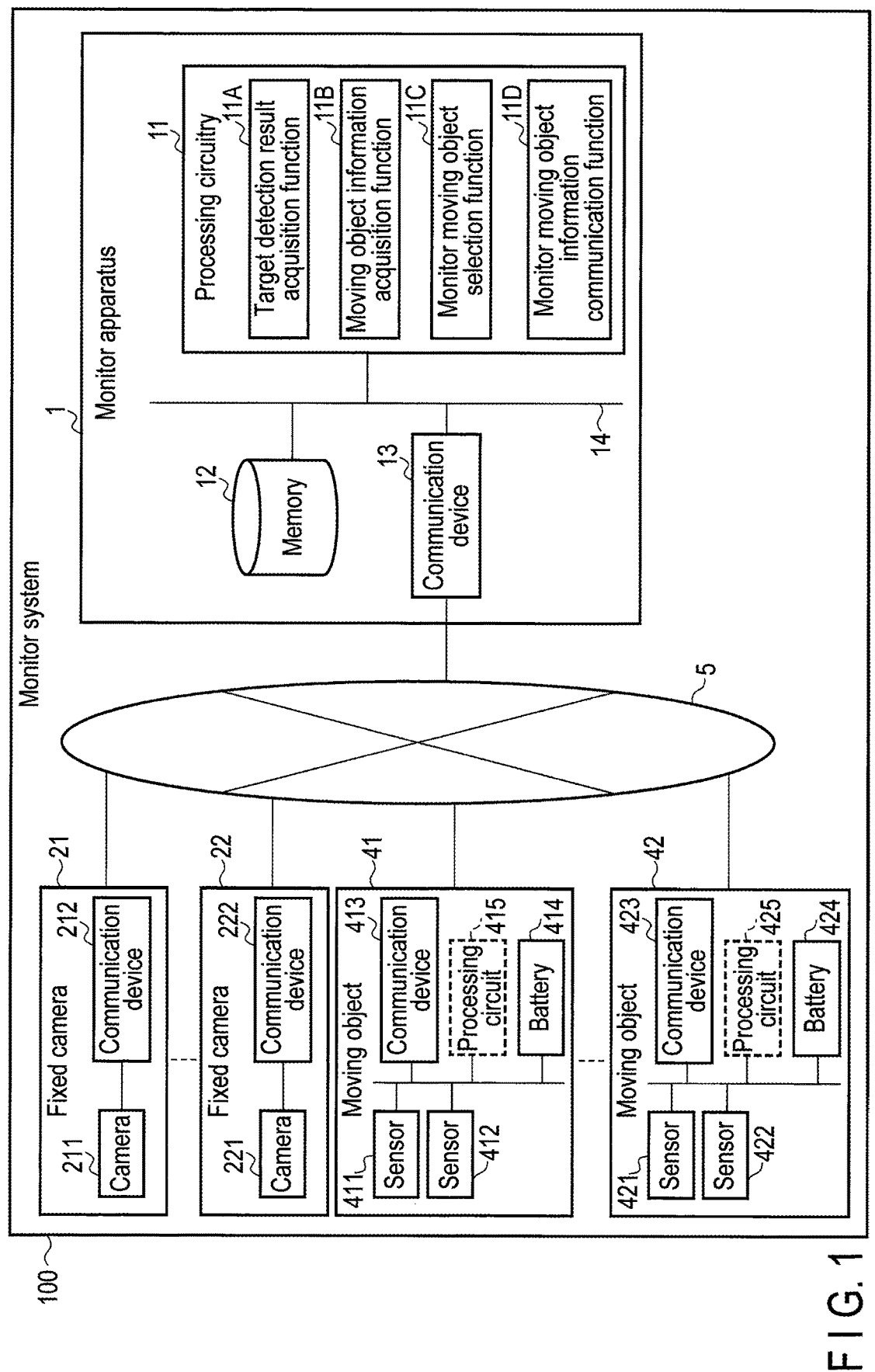
FIG. 1 is an exemplary block diagram for explaining a configuration of a monitor system including a monitor apparatus according to an embodiment.

First, a schematic configuration of a monitor system 100 including a monitor apparatus according to an embodiment will be described with reference to FIG. 1. This monitor system 100 is a system for monitoring a specific target that is present in a monitor region such as, for example, a parking lot and an intersection. This specific target is, for example, a person or an animal. The monitor system 100 includes, for example, a monitor apparatus 1, fixed cameras 21 and 22, moving objects 41, 42, and a network 5. The monitor apparatus 1 and each of the fixed cameras 21, 22 and the moving objects 41, 42 are connected via the network 5, and various data can be exchanged. The monitor apparatus 1 executes processing to monitor a specific target in the monitor region by using data received from the fixed cameras 21, 22 and moving objects 41, 42.

The fixed cameras 21 and 22 are fixedly installed on the streets, buildings, and the like, such as, for example, a parking lot and an intersection, and are used to acquire images or videos of a place where the fixed cameras 21 and 22 are installed. The fixed camera 21 includes a camera 211, a communication device 212, and the like. The camera 211 captures an image of the place where the camera 211 is installed. The communication device 212 is configured to execute communication via a wire or wirelessly. The communication device 212 includes a transmitter for transmitting a signal and a receiver for receiving a signal. The fixed camera 21 can transmit image data captured by the camera 211 to the monitor apparatus 1 via the communication device 212. Likewise, the fixed camera 22 can transmit data of the image captured by the camera 221 to the monitor apparatus 1 via the communication device 222.

The moving objects 41, 42 are objects which move by power of a motor or the like, such as, for example, a robot or a vehicle. The moving object 41 includes various kinds of sensors 411 and 412 such as a camera, a video camera, a GPS receiver, a LIDAR, a radar, a sonar, and the like, a communication device 413, a battery 414, and the like. The LIDAR is, for example, a laser range finder. The radar is, for example, millimeter wave radar. The sensors 411 and 412 perform, for example, acquisition of the position of the moving object 41, capturing of an image, detection as to whether there is an object in the surroundings and a distance to the surrounding object. In addition, the communication device 413 is configured to perform communication via a wire or wirelessly. The communication device 413 includes a transmitter for transmitting a signal and a receiver for receiving a signal. The moving object 41 can transmit data indicating the position, image, detection result, and the like acquired by the sensors 411, 412 to the monitor apparatus 1 via the communication device 413. The moving object 41 can operate the sensors 411, 412 and the communication device 413 by using electric power supplied from the battery 414.

Likewise, the moving object 42 can transmit data indicating the position, image, detection result, and the like acquired by the sensors 421, 422 to the monitor apparatus 1 via the communication device 423. The moving object 42 can operate the sensors 421, 422 and the communication device 423 by using electric power supplied from the battery 424.

Since the target moves and the moving objects 41 and 42 also move within the monitor region, the fixed cameras 21, 22 and the sensors 411, 412, 421, 422 of the moving objects 41, 42 capable of monitoring the target are dynamically different. More specifically, this monitor region can be said to be in an environment where blind spot dynamically changes. In response to such a change in the blind spot, the monitor apparatus 1 dynamically selects the sensors of the moving objects 41, 42 used for monitoring, and executes processing for monitoring the specific target in the monitor region by using the data received from the moving object having the selected sensor and/or the fixed cameras 21, 22. More specifically, the monitor apparatus 1 can monitor a pedestrian passing through a parking lot or an intersection by using the data received from the fixed cameras 21, 22 and/or the moving objects 41, 42 having the sensors for monitoring. Then, the monitor apparatus 1 notifies the information about the monitored pedestrian to, for example, the moving objects 41, 42, so that an accident of collision of the moving objects 41, 42 with the pedestrian can be prevented.

The monitor apparatus 1 can be realized as a dedicated or general-purpose computer, or a built-in system embedded in various kinds of electronic devices. The monitor apparatus 1 includes processing circuitry 11, a memory 12, a communication device 13, and a bus 14. The processing circuitry 11, the memory 12 and the communication device 13 may be connected to each other via the bus 14.

The processing circuitry 11 has a target detection result acquisition function 11A, a moving object information acquisition function 11B, a monitor moving object selection function 11C, and a monitor moving object information communication function 11D. Each of these functions is stored in the memory 12 in the form of a program executable by the computer. The processing circuitry 11 is a processor that realizes the function corresponding to each program by reading a program from the memory 12 and executing the program. The processing circuitry 11 in a state where each program is read has the functions 11A to 11D described above. Although FIG. 1 showed an example in which the processing corresponding to the target detection result acquisition function 11A, the moving object information acquisition function 11B, the monitor moving object selection function 11C, and the monitor moving object information communication function 11D are realized with the processing circuitry 11 having a single processor, these functions may also be realized by making the processing circuitry 11 by combining multiple independent processors and causing each processor to execute the program. Alternatively, each processing function may be configured as a program, and each program may be executed by a single processing circuit, or the specific function may be implemented in a dedicated independent program execution circuit.

It should be noted that the target detection result acquisition function 11A, the moving object information acquisition function 11B, the monitor moving object selection function 11C, and the monitor moving object information communication function 11D provided in the processing circuitry 11 are examples of a target detection result acquisition module, a moving object information acquisition module, a monitor moving object selection module, and a monitor moving object information communication module, respectively, explained later.

The term "processor" used in the above description means, for example, a central processing unit (CPU), a graphical processing unit (GPU), an application specific integrated circuit (ASIC), or a circuit of a programmable logic device. The programmable logic device is, for example, simple programmable logic device (SPLD), complex programmable logic device (CPLD) or field programmable gate array (FPGA). The processor realizes the function by reading and executing the program saved in the memory 12. Instead of storing the program into the memory 12, a program may be directly incorporated into the circuit of the processor. In this case, the processor realizes the function by reading and executing the program incorporated in the circuit.

The memory 12 stores data and the like according to each processing function performed by the processing circuitry 11 as necessary. The memory 12 of the present embodiment stores, for example, various kinds of programs and data received from the fixed cameras 21, 22 and the moving objects 41, 42. The programs include, for example, an operating system (OS) and programs for monitoring the target. The memory 12 is a semiconductor memory element such as, for example, a random access memory (RAM), a flash memory, and the like, a hard disk, an optical disc, or the like. Various kinds of data stored in the memory 12 may be stored in a storage device provided outside of the monitor apparatus 20. The memory 12 may be a storage medium for storing or temporarily storing a program transmitted from a server (not shown) on the network 5 via a connection based on various kinds of communication methods such as wired or wireless local area network (LAN) and 3G and 4G mobile communication. The server on the network 5 is, for example, a server on the Internet. The memory 12 may not be a single storage medium, and multiple mediums storing the above data is also included in the storage medium of the embodiment, and the configuration of the medium may be in any configuration.

The communication device 13 is an interface for inputting and outputting information with an external apparatus connected via a wire or wirelessly. The communication device 13 may perform communication by connecting to the network 5. The communication device 13 includes a transmitter for transmitting a signal and a receiver for receiving a signal.

Figure 2:
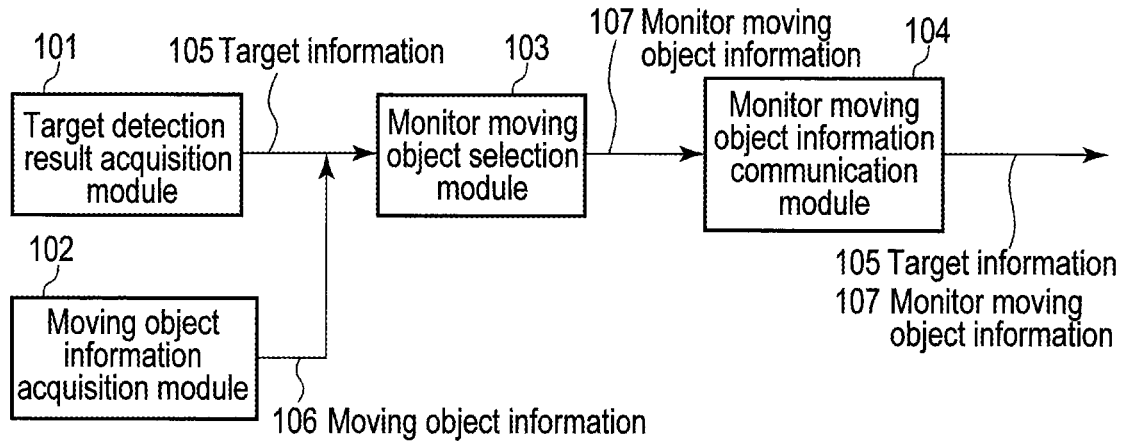
FIG. 2 is an exemplary block diagram showing a functional configuration of the monitor apparatus of the embodiment.

FIG. 2 is a block diagram showing the functional configuration of the monitor apparatus 1. This functional configuration can be realized as a functional configuration of a program executed by, for example, the processing circuitry 11. The monitor apparatus 1 includes, for example, a target detection result acquisition module 101, a moving object information acquisition module 102, a monitor moving object selection module 103, and a monitor moving object information communication module 104. The target detection result acquisition module 101, the moving object information acquisition module 102, the monitor moving object selection module 103, and the monitor moving object information communication module 104 are processing modules for realizing the target detection result acquisition function 11A, the moving object information acquisition function 11B, the monitor moving object selection function 11C, and the monitor moving object information communication function 11D, respectively, as illustrated in FIG. 1.

The target detection result acquisition module 101 obtains the target information 105 including the position of the target to be monitored and the moving direction of the target. The target detection result acquisition module 101 sends the acquired target information 105 to the monitor moving object selection module 103.

The moving object information acquisition module 102 acquires the moving object information 106 including information indicating the positions of the moving objects 41, 42 and the sensors provided in the moving objects 41, 42. The moving object information acquisition module 102 sends the acquired moving object information 106 to the monitor moving object selection module 103.

The monitor moving object selection module 103 selects at least one monitor moving object for monitoring the target from the moving objects 41 and 42 and/or selects at least one monitoring sensor from the sensors provided in the moving objects 41 and 42, based on the target information 105 and the moving object information 106. The monitor moving object selection module 103 selects the monitor moving object and/or the monitoring sensor based on, for example, the position and the moving direction of the target included in the target information 105 and the monitorable range of each sensor provided in the moving objects 41 and 42 included in the moving object information. The monitor moving object selection module 103 sends the monitor moving object information 107 including information about the selected monitor moving object and/or monitoring sensor to the monitor moving object information communication module 104.

The monitor moving object information communication module 104 transmits information indicating at least one of the monitor moving object and the monitoring sensor and the target information 105 to the monitor moving object, by using the monitor moving object information 107. In addition, the monitor moving object information communication module 104 receives information obtained by the sensor provided in the monitor moving object or information obtained by the monitoring sensor.

Subsequently, the operation of this monitor apparatus 1 will be described in details.

Figure 3:
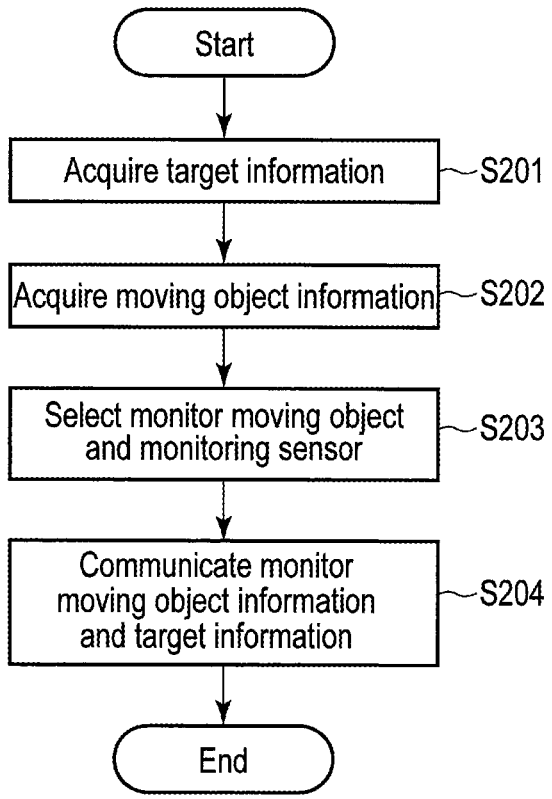
FIG. 3 is an exemplary flowchart showing the procedure of processing executed by the monitor apparatus of the embodiment.

FIG. 3 is a flowchart showing the procedure of the processing executed by the processing circuitry 11 provided in the monitor apparatus 1. The operation of each of the modules 101 to 104 will be described with reference to FIG. 3.

First, the target detection result acquisition module 101 acquires the target information 105 including the position of the moving object and the moving direction of the moving object (step S201).

FIG. 4 shows the configuration of the target detection result acquisition module 101. The target detection result acquisition module 101 includes, for example, an image capturing module 301, a target detection module 302, a target position calculation module 303, a target moving direction calculation module 304, a target recognition module 305, a target position acquisition module 306, a target moving direction acquisition module 307, and an integration module 308.

The image capturing module 301 acquires the captured image 309. The image capturing module 301 receives the image captured by the camera 211 or 221 provided in, for example, the fixed camera 21 or 22 via the network 5, thereby acquiring the received image as the captured image 309. The captured image 309 may be an image captured by one fixed camera installed on a road or the like or may be multiple images captured by two or more fixed cameras.

The target detection module 302 detects a monitored target by using the captured image 309. The target detection module 302 sends a target detection result 3010 indicating the detected target to the target position calculation module 303 and the target moving direction calculation module 304.

The target position calculation module 303 calculates the position 3011 of the target using the target detection result 3010. The target moving direction calculation module 304 calculates a moving direction 3012 of the target using the target detection result 3010.

More specifically, the target detection module 302 holds the dictionary data of the target identifier for recognizing the monitored target in advance and detects the target from the captured image 309 by using this dictionary data.

In this explanation, for example, the monitored target is a pedestrian.

The dictionary data of target identifier includes features such as histogram of oriented gradients (HOG), co-occurrence histograms of oriented gradients (CoHOG) which are considered to be effective to detect a pedestrian. The features are calculated in advance for a rectangular region on each training image by using training images in which, for example, a rectangular region including a pedestrian and a rectangular region not including a pedestrian are adopted as a positive example and a negative example, respectively, about the pedestrian. By causing the identifier based on support vector machine (SVM), Adaboost, and the like to learn by using such features, a target identifier that can distinguish the pedestrian can be acquired.

When determining whether a pedestrian is present in any given rectangular region in the captured image 309, first, the target detection module 302 calculates features of the rectangular region in the same manner as the above training image. Then, the target detection module 302 uses the target identifier and the calculated features to determine whether this rectangular region contains a pedestrian. Therefore, a result as to whether a pedestrian is present in any given rectangular region can be obtained. However, things other than the above-mentioned features and identifier can also be used as the method of determining whether a pedestrian is present in a rectangular region, and those that can be used for the method are not limited to the features and the identifier listed above. It is also possible to detect a pedestrian by using deep learning that can simultaneously perform the calculation of features and the identification.

In a case where a pedestrian is detected from the captured image 309, Selective Search method can be an example of a method for setting a rectangular region on the captured image 309 in which a pedestrian is to be determined to be present or not, but the method is not limited thereto. Alternatively, it is also possible to use a subtracted image between the captured image 309 and a background image to acquire the rectangular region relating to the pedestrian. As described above, since the target detection module 302 can detect a rectangular region including a pedestrian from the captured image 309, the position of the detected pedestrian in the captured image 309 can be acquired.

When the captured image 309 acquired by the image capturing module 301 is mapped on the monitor region in advance, or more specifically, when a range on the monitor region corresponding to the captured image 309 has been acquired in advance, the target position calculation module 303 can calculate the position 3011 of the pedestrian on the monitor region based on the position of the pedestrian on the captured image 309. Furthermore, the target moving direction calculation module 304 can also calculate the movement amount of the pedestrian based on the positions of the pedestrian among captured images 309 that are successively captured, so that the moving direction 3012 of the pedestrian can be calculated.

In addition, the target detection result acquisition module 101 can also acquire information about the currently continuously monitored target, i.e., the already detected target simultaneously with the target detected for the first time as described above. In the following explanation, the continuously monitored target may also be referred to as a monitored target.

More specifically, the target recognition module 305 recognizes the monitored target by using the data acquired by the monitoring sensor for monitoring the monitored target, and acquires target recognition information 3013 including this recognition result and information that can specify the target. The monitoring sensor is, for example, a LIDAR, a camera, a radar, a sonar, and the like. The information that can specify the target, for example, an ID given to the target. For example, the target recognition module 305 may recognize the monitored target from the image captured by the monitoring sensor, i.e., a camera, in the same manner as the detection of the target with the target detection module 302. In addition, the target recognition module 305 may recognize an object estimated as a monitored target from three-dimensional data obtained by a monitoring sensor, i.e., a LIDAR and a radar. For example, the target recognition module 305 recognizes an object having a feature of a monitored target as an object estimated as a monitored target. The target recognition module 305 sends the acquired target recognition information 3013 to the target position acquisition module 306 and the target moving direction acquisition module 307.

The target position acquisition module 306 acquires the position 3014 of the monitored target on the monitor region by using the target recognition information 3013 and sends the position 3014 of the monitored target to the integration module 308. The target moving direction acquisition module 307 acquires the moving direction 3015 on the monitor region of the monitored target by using the target recognition information 3013 and sends it to the integration module 308. The acquisition method of the position 3014 and the moving direction 3015 of the monitored target is similar to, for example, the acquisition method of the position 3011 and the moving direction 3012 of the target with the above described target position calculation module 303 and the target moving direction calculation module 304 explained above.

The integration module 308 integrates the position 3011 and the moving direction 3012 of the newly detected target and the position 3014 and the moving direction 3015 of the monitored target, and transmits the target information 105 obtained by integrating them to the monitor moving object selection module 103.

Subsequently, the moving object information acquisition module 102 acquires the moving object information 106 including the information about the positions of the moving objects 41, 42 and the sensors provided in the moving objects 41, 42 (step S202).

Figure 5:
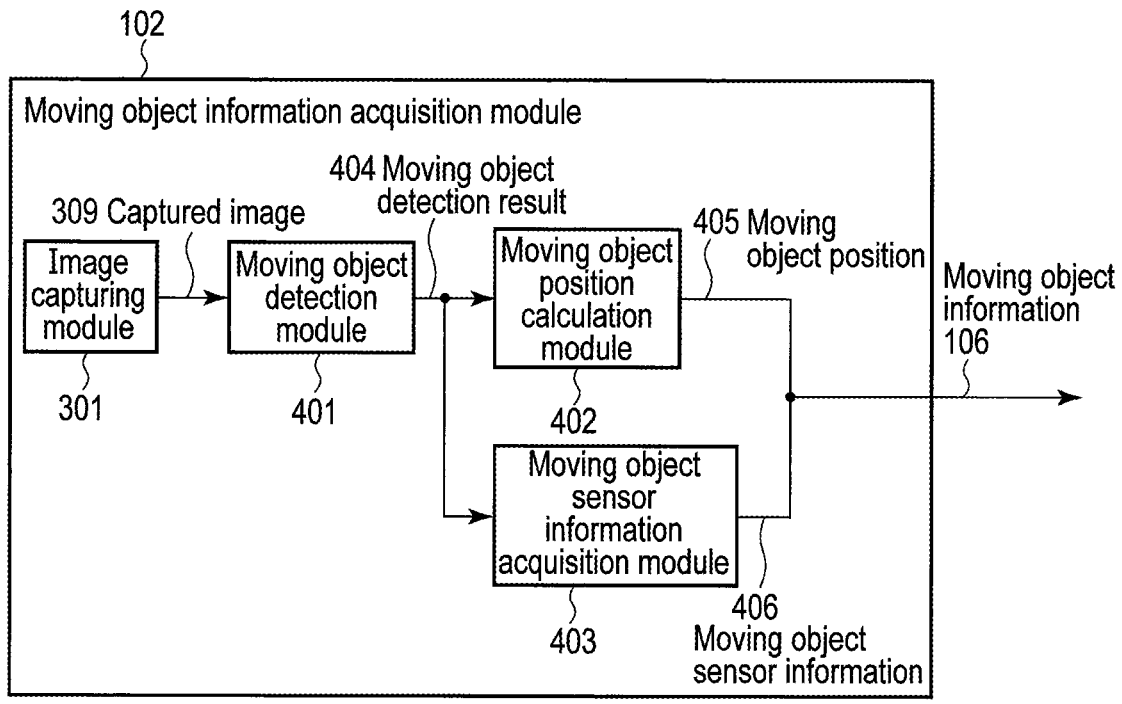
FIG. 5 is an exemplary block diagram showing a configuration of a moving object information acquisition module in the monitor apparatus of the embodiment.

FIG. 5 shows the configuration of moving object information acquisition module 102. The moving object information acquisition module 102 includes, for example, an image capturing module 301, a moving object detection module 401, a moving object position calculation module 402, and a moving object sensor information acquisition module 403.

The image capturing module 301 acquires the captured image 309. The image capturing module 301 receives images captured by the cameras 211, 221 provided in, for example, the fixed cameras 21, 22 via the network 5, thereby acquiring the received image as the captured image 309. This image capturing module 301 may be the same as the image capturing module 301 provided in the target detection result acquisition module 101. More specifically, the captured image 309 acquired by the image capturing module 301 may be used by both the target detection result acquisition module 101 and the moving object information acquisition module 102, respectively.

The moving object detection module 401 acquires the moving object detection result 404 using the captured image 309 and sends the moving object detection result 404 to the moving object position calculation module 402 and the moving object sensor information acquisition module 403. The moving object position calculation module 402 acquires a position 405 of the moving object by using the moving object detection result 404. The moving object sensor information acquisition module 403 acquires moving object sensor information 406 indicating the sensor provided in the moving object by using the moving object detection result 404. The position 405 of the moving object and the moving object sensor information 406 are used as moving object information 106.

More specifically, the moving object detection module 401 holds in advance the dictionary data of the moving object identifier for identifying the moving object and detects the moving object from the captured image 309 by using this dictionary data. This moving object is, for example, a vehicle, a robot, and the like.

In this explanation, for example, the detected moving object is a vehicle.

The dictionary data of moving object identifier includes features such as histograms of oriented gradients (HOG), edge of orientation histogram (EOH), Edgelet, and the like which are calculated in advance for a rectangular region on each training image. The features are calculated by using training images in which, for example, a rectangular region including a vehicle and a rectangular region not including a vehicle are adopted as a positive example and a negative example, respectively, about the vehicle. By causing the identifier based on support vector machine (SVM) and the like to learn by using suchfeatures, a moving object identifier that can distinguish the vehicle can be acquired.

When determining whether a vehicle is present in any given rectangular region in the captured image 309, first, the moving object detection module 401 calculates features of the rectangular region in the same manner as the above training image. Then, the moving object detection module 401 determines whether the calculated features corresponds to a vehicle by using the moving object identifier. Therefore, a result as to whether a vehicle is present in any given rectangular region can be obtained. However, things other than the above-mentioned features and identifier can also be used as the method of determining whether a vehicle is present in a rectangular region, and those that can be used for the method are not limited to the features and the identifier listed above. It is also possible to detect a vehicle by using deep learning that can simultaneously perform the calculation of features and the identification.

The moving object position calculation module 402 calculates the moving object position 405 which is the position on the monitor region where the vehicle detected by the moving object detection module 401 is present. As same as the calculation performed with the target position calculation module 303 to calculate the position on the monitor region where target is present, when the captured image 309 acquired by the image capturing module 301 is mapped on the monitor region in advance, i.e., when a range on the monitor region corresponding to the captured image 309 is acquired in advance, the moving object position calculation module 402 can calculate the moving object position 405 which is the position of the vehicle on the monitor region based on the position of the vehicle on the detected captured image 309.

The moving object sensor information acquisition module 403 may acquire the moving object sensor information 406 from the moving object via communication. The moving object sensor information acquisition module 403 may determine the type of the moving object via communication, and may acquire sensor information 406 corresponding to the moving object from a server or the like storing various kinds of information such as sensor information indicating the sensor provided in the moving object for each type of moving object. The moving object sensor information acquisition module 403 determines, for example, a vehicle type, and acquires the sensor information 406 corresponding to the vehicle type from a server or the like. It should be noted that the acquisition of the sensor information 406 is not limited to these acquisition methods.

It should be noted that the moving object position calculation module 402 may be configured to communicate with the vehicle to acquire the moving object position 405 which is the position of the vehicle. For example, a vehicle entering into the monitor region (which may be hereinafter also referred to as a first vehicle) continues to communicate with the monitor apparatus 1 using the ID given to the first vehicle in advance with the processing circuit 415 and the communication device 413. The moving object position calculation module 402 of the monitor apparatus 1 holds a list of IDs assigned to the vehicles in the monitor region and uses this list to determine whether there is another vehicle using the same ID. When the same ID is not used, the monitor apparatus 1 allows the first vehicle to use the ID and thereafter uses this ID when acquiring the position of the first vehicle. On the other hand, in a case where the same ID is already used, another ID is assigned to the first vehicle, and the first vehicle and the monitor apparatus 1 share the ID. From the point where the ID is fixed to when the first vehicle stops, the first vehicle determines the position of the first vehicle by using a GPS signal received by the GPS receiver and transmits the position to the monitor apparatus 1. The moving object position calculation module 402 can acquire the moving object position 405, which is the position on the monitor region where the first vehicle is present, by converting the position using map information stored in advance.

Alternatively, a sensor for detecting the vehicle parked or stopped may be installed at the center of each parking or stopping position, and the vehicle may be searched by using the information indicating the vehicle parked and stopped in the monitor region detected by this sensor. This sensor can be installed on, for example, the ground or the ceiling. The installed sensor can exchange data with the vehicle by various kinds of short distance wireless communication or communication via network 5. Therefore, information about the parking or stopping position of the vehicle is shared between this sensor and the vehicle. Then, the ID of the vehicle, the information on the parking or stopping position, and the like are transmitted to the monitor apparatus 1 from this vehicle, so that the moving object position calculation module 402 can acquire the moving object position 405 which is the position of the vehicle. Further, when the vehicle is parked to the position specified in an issued parking ticket in a parking lot which issues a parking ticket in advance, the moving object position 405 which is the parking position of the vehicle can be obtained.

The orientation of the front of the vehicle can be obtained by causing the vehicle to perform, multiple times, communication about the position of the vehicle by using the ID with the monitor apparatus 1, and also transmitting information indicating the position of the shift lever of the vehicle. Information indicating the position of the shift lever of the vehicle includes information about, for example, forward, backward, and the like. The orientation of the parked or stopped vehicle is used to determine, for example, the position and orientation of each sensor provided in the vehicle, and to specify the monitorable range with the sensor.

The moving object sensor information acquisition module 403 can obtain the moving object sensor information 406 when information indicating the sensor provided in the vehicle is transmitted from the vehicle to the monitor apparatus 1 using the ID.

With the above processing, the moving object information acquisition module 102 acquires the moving object position 405 and the moving object sensor information 406 as the moving object information 106, and sends this moving object information 106 to the monitor moving object selection module 103. The moving object information 106 includes information about the parking position of the vehicle and the type of the sensor installed on the vehicle, but it is not limited to such information.

Subsequently, the monitor moving object selection module 103 selects monitor moving object and monitoring sensor (step S203). The monitor moving object selection module 103 selects at least one of a monitor moving object for monitoring a target from among moving objects and a monitoring sensor for monitoring the target from among sensors provided on the moving objects, based on the target information 105 and the moving object information 106.

Figure 6:
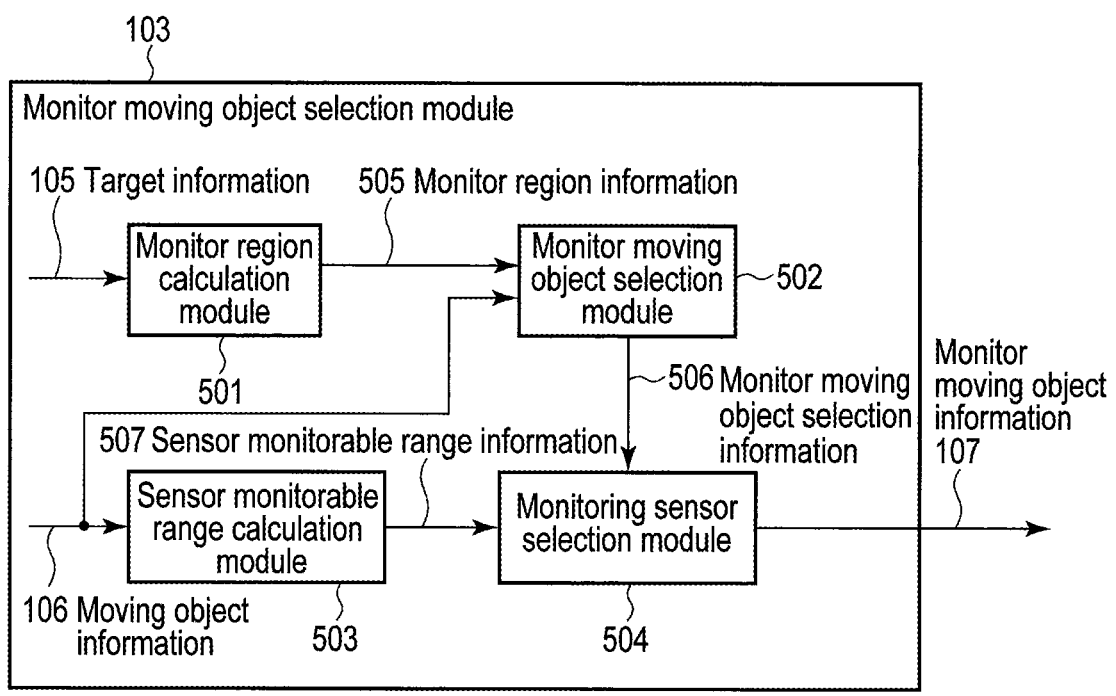
FIG. 6 is an exemplary block diagram showing a configuration of a monitor moving object selection module in the monitor apparatus of the embodiment.

FIG. 6 shows the configuration of the monitor moving object selection module 103. The monitor moving object selection module 103 includes, for example, a monitor region calculation module 501, a monitor moving object selection module 502, a sensor monitorable range calculation module 503, and a monitoring sensor selection module 504.

The monitor region calculation module 501 calculates monitor region information 505 using the target information 105 acquired by the target detection result acquisition module 101. Then, the monitor moving object selection module 502 acquires the monitor moving object selection information 506 based on the monitor region information 505 and the moving object information 106 acquired by the moving object information acquisition module 102. The sensor monitorable range calculation module 503 also acquires the monitorable range information 507 of the sensor provided in the moving object in the monitor region using the moving object information 106. Then, the monitoring sensor selection module 504 selects the sensor provided in the selected monitored moving object based on the sensor monitorable range information 507 and the monitor moving object selection information 506, and acquires the monitor moving object information 107.

Figure 7:
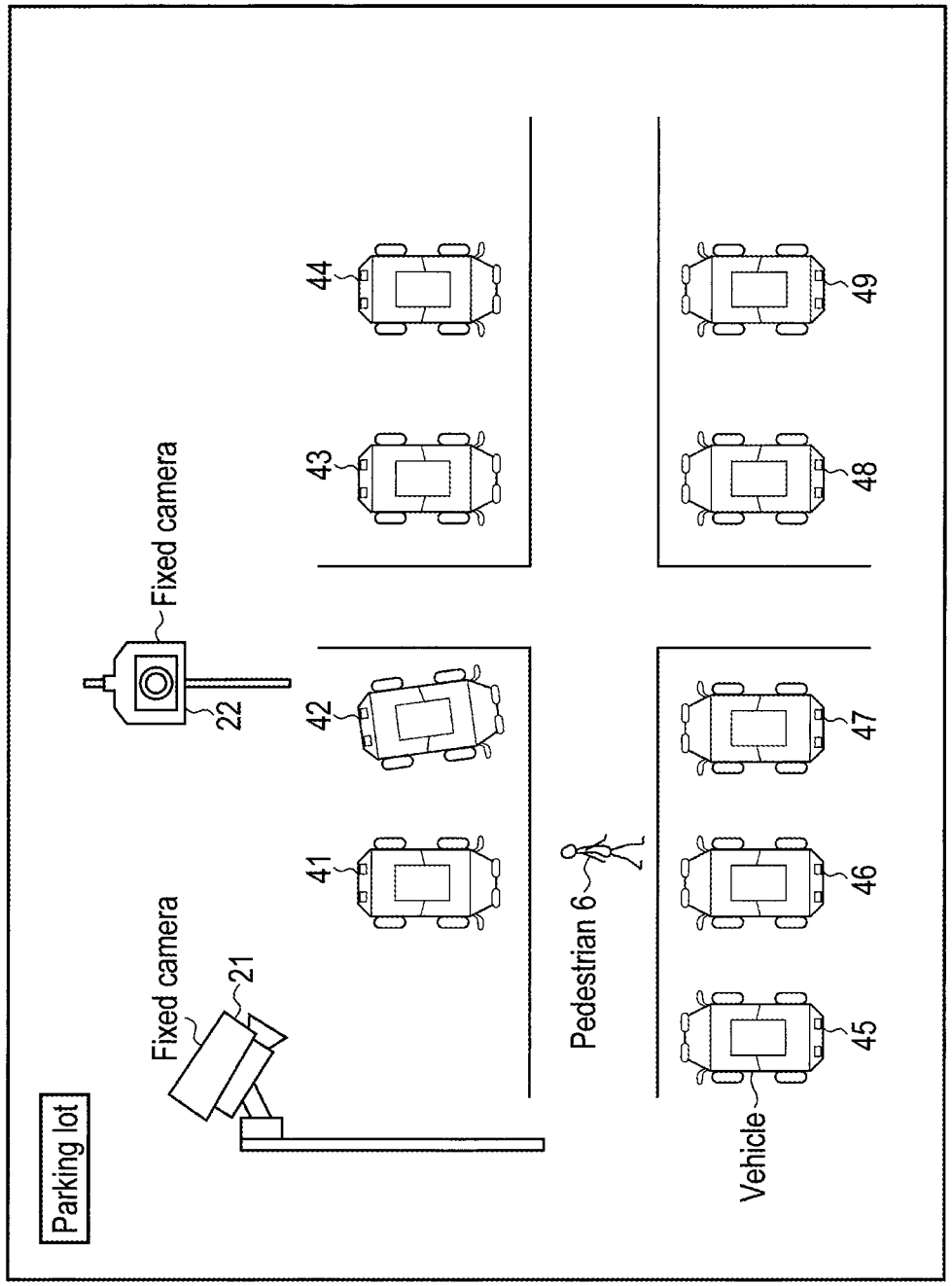
FIG. 7 is a diagram for explaining an example of an environment monitored by the monitor apparatus of the embodiment, in which the monitor region is a parking lot, the target is a pedestrian, and the moving object is a vehicle.

Subsequently, an example in which a pedestrian passing through a parking lot is monitored by the monitor apparatus 1 of the present embodiment will be explained with reference to FIG. 7 to FIG. 15. As shown in FIG. 7, two fixed cameras 21, 22 are installed in the parking lot which is the monitor location, and vehicles 41 to 49 which are moving objects are parked. Since the fixed cameras 21, 22 are installed at the exit and entrance of the parking lot or at the position from which the fixed cameras 21, 22 can overlook the entire parking lot, the fixed cameras 21, 22 can captures images in which a pedestrian 6 and the vehicles 41 to 49 coming into the parking lot are easily detected. In the following explanation, for example, the pedestrian 6 who is present in this parking lot is the target monitored by the monitor apparatus 1, and a monitor moving object for monitoring this pedestrian 6 is selected from the vehicles 41 to 49.

First, the monitor region will be explained. When the parking lot as shown in FIG. 7 is set as the monitor location, the monitoring region is set to the parking lot in order to monitor the pedestrian 6 who is present in this parking lot. The monitor apparatus 1 may perform processing for monitoring the entire monitor region or may perform processing for monitoring a part of the monitor region. In the following, the region to be processed to be monitored by monitor apparatus 1 may also be hereinafter referred to as the monitor region of interest. When the entire monitor region, i.e., the entire parking lot is set as the monitor region of interest, all the vehicles 41 to 49 in this monitor region are used as monitor moving object candidates to be selected as the monitor moving object.

An example in which, when the entire monitor region is set to the monitor region of interest, a monitor moving object for monitoring the pedestrian 6 is selected from the vehicles 41 to 49, i.e., the monitor moving object candidates, in this monitor region of interest will be hereinafter explained with reference to FIG. 8 to FIG. 10. As shown in FIG. 8, the monitor moving object selection module 502 in the monitor moving object selection module 103 calculates the position of the center of each vehicles 41 to 49 which are parked or stopped and the position of the center of pedestrian 6. As shown in FIG. 9, the monitor moving object selection module 502 calculates the distance between the pedestrian 6 and each of the vehicles 41 to 49 which are parked based on the positions of the centers of the vehicles 41 to 49 and the position of the center of the pedestrian 6 which have been calculated. Then, as illustrated in FIG. 10, the monitor moving object selection module 502 selects up to n vehicles 41, 42, 46, and 47 from the vehicles 41 to 49 in the ascending order of the distance from the pedestrian 6 as the monitor moving objects, i.e., the monitor vehicles A and B, C, and D. In the example shown in FIG. 10, n is 4. The monitoring sensor selection module 504 selects a monitoring sensor for monitoring the pedestrian 6 from the sensors provided in each of the monitor moving objects 41, 42, 46, and 47. In the case where one sensor is installed in the monitor moving object, the selection made by the monitoring sensor selection module 504 is unnecessary since the single sensor is used as the monitoring sensor. When multiple sensors are installed in the monitor moving object, the monitoring sensor selection module 504 may select, as the monitoring sensors, all the sensors provided in the monitor moving object. Further, the monitoring sensor selection module 504 may not select the monitoring moving object, and may select the monitoring sensor from multiple sensors existing in monitor region of interest. In this case, for example, an ID is attached to each sensor, and the monitoring sensor is selected from the multiple sensors specified by the IDs.

Figure 11:
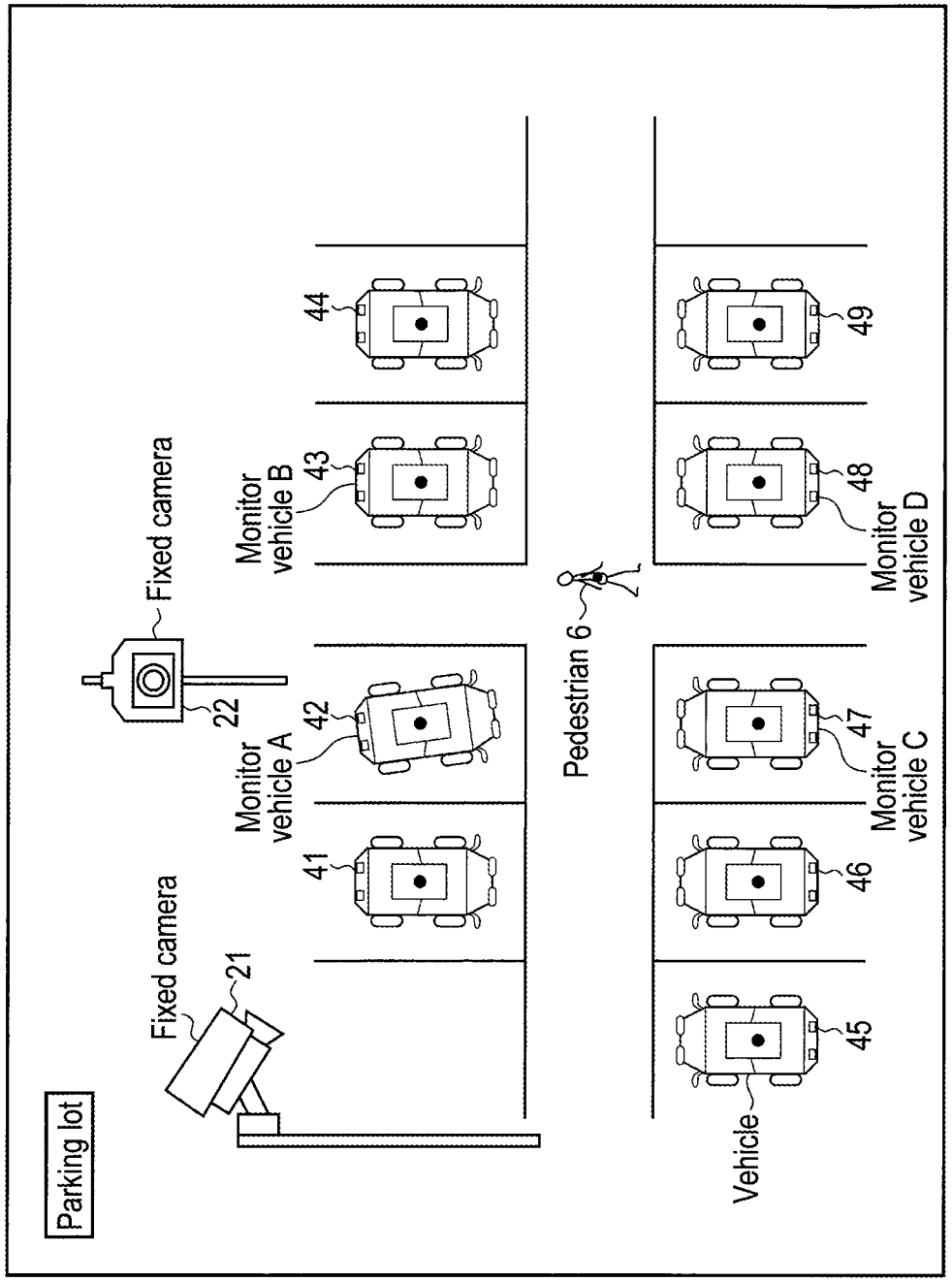
FIG. 11 is a view showing another example in which a monitor moving object for monitoring a pedestrian is selected in the monitor region of FIG. 7.

When the pedestrian 6 moves in the monitor region of interest, the monitor moving object selection module 502 of the monitor moving object selection module 103 dynamically changes the monitor moving object for monitoring the pedestrian 6. As described above, the target detection result acquisition module 101 calculates the position and the moving direction of the target, which is being monitored, by using the information acquired using the currently selected monitoring sensor. The monitor moving object selection module 502 selects a new moving object for monitoring the target from among the vehicles 41 to 49 based on the position and the moving direction of the target calculated, and selects a new monitoring sensor for monitoring the target from one or more sensors provided in this new moving object. In the example as shown in FIG. 11, the monitor moving object selection module 502 selects, as the new monitor moving objects, the vehicles 42, 43, 47, and 48 from the vehicles 41 to 49 in the ascending order of the distance from the pedestrian 6 having moved. Then, the monitoring sensor selection module 504 selects a monitoring sensor for monitoring the pedestrian 6 from the sensors provided in each of the new monitor moving objects 42, 43, 47, and 48.

When the pedestrian 6 moves in the monitor region of interest, the monitor moving object having the monitoring sensor may notify the monitor moving object selection module 103 of the monitor apparatus 1 that at least one of the monitoring sensor and the monitor moving object is to be changed. When the pedestrian 6 is expected to move outside of the range that can be monitored by the sensor 411 based on the position of the pedestrian 6 detected by using the data provided by the sensor 411, for example, the processing circuit 415 of the vehicle 41 selected as the monitor moving object may notify the monitor apparatus 1 via the communication device 413 that the monitoring sensor is to be changed to another sensor or the monitor moving object may be changed to another moving object.

When the parked or stopped vehicle gets out of the monitor region of interest, or a new vehicle parks or stops in the monitor region of interest, the monitor moving object selection module 103 can dynamically change the monitor moving object for monitoring the pedestrian 6. FIG. 12 shows an example in the case where the vehicle 48 parked or stopped in the monitor region of interest in the example shown in FIG. 11 comes out from the monitor region of interest. In this case, the monitor moving object selection module 502 of the monitor moving object selection module 103 selects, as the new monitor moving objects, the vehicles 42, 43, 47, and 49 from the vehicles 41 to 47, and 49 in the ascending order of the distance from the pedestrian 6.

The monitor moving object selection module 502 can calculate the position of the center of the parked or stopped vehicle by using the moving object position 405 included in the moving object information 106. The position of the center of each parking rectangular region where the vehicle is parked or stopped can be used as the position of the center of each of the parked or stopped vehicles 41 to 49. The method for calculating the position of the center of the vehicle is not limited to the method for performing calculation by using the moving object position 405 of the moving object information 106.

The monitor moving object selection module 502 may count the number of times each of the vehicles 41 to 49 has been selected as the monitor moving object and may record the counted number of times. The monitor moving object selection module 502 can select the monitor moving object from the vehicles 41 to 49 by using at least one of the number of times of selection and the battery level of each of the vehicles 41 to 49. For example, the monitor moving object selection module 502 may select a monitor moving object from moving objects each of which number of times of selection is less than a threshold value. For example, the monitor moving object selection module 502 may select a monitor moving object from among moving objects each of which battery level is more than the threshold value.

Figure 14:
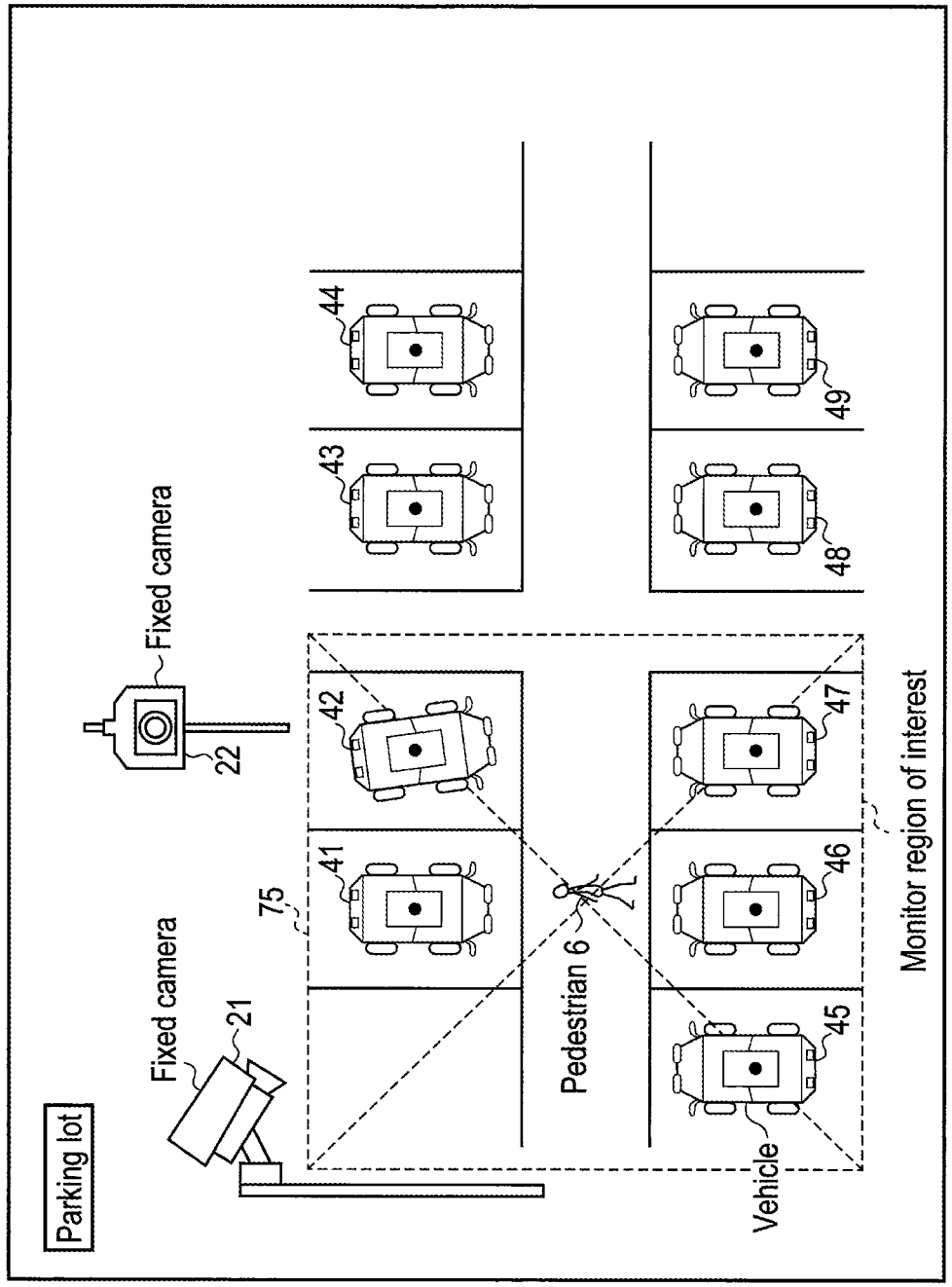
FIG. 14 is a diagram showing another example in which a split monitor region which is a part of the monitor region of FIG. 7 is used as a monitor region of interest.

By the way, when the parking lot is larger, the number of vehicles that can be parked or stopped in the parking lot is expected to increase. In such case, when all the vehicles in the parking lot are adopted as monitor moving object candidates, and when the monitor moving object is selected from those monitor moving object candidates, the computational cost for that selection may increase. For this reason, instead of setting the entire parking lot shown in FIG. 7, i.e., the entire monitor region, as the monitor region of interest, a part of the monitor region may be set as the monitor region of interest as shown in FIG. 13 or FIG. 14. For example, two types of monitor regions of interest are shown in FIG. 13 and FIG. 14.

FIG. 13 shows an example in which multiple split monitor regions 71 and 72 are set in the monitor region by splitting the entire monitor region in advance into small regions. From the multiple split monitor regions 71 and 72, the monitor region calculation module 501 sets, as the monitor region of interest, the split monitor region 71 where the pedestrian 6, which is the target to be monitored, is present.

Alternatively, as shown in FIG. 14, the monitor region calculation module 501 may set a specific range around the pedestrian 6, who is the target to be monitored, as the monitor region of interest. This specific range is, for example, a rectangular range.

The monitor region calculation module 501 outputs, to the monitor moving object selection module 502, the monitor region information 505 indicating the monitor region of interest that has been set.

Even when a part of the monitor region is set to the monitor region of interest, the monitor moving object selection module 502 can select the monitor moving object from the moving objects which are present in the monitor region of interest in a manner similar to the method described above with reference to FIG. 8 to FIG. 12. More specifically, the monitor region calculation module 501 and the monitor moving object selection module 502 can select, from among moving objects present in the monitor region, moving objects present in the monitor region of interest which is a part of the monitor region and where the target is present, for example, in the split monitor region 71. Then, the monitor region calculation module 501 and the monitor moving object selection module 502 can select the moving object for monitoring the target based on the target information 105 and the moving object information 106 from the selected moving objects.

Figure 15:
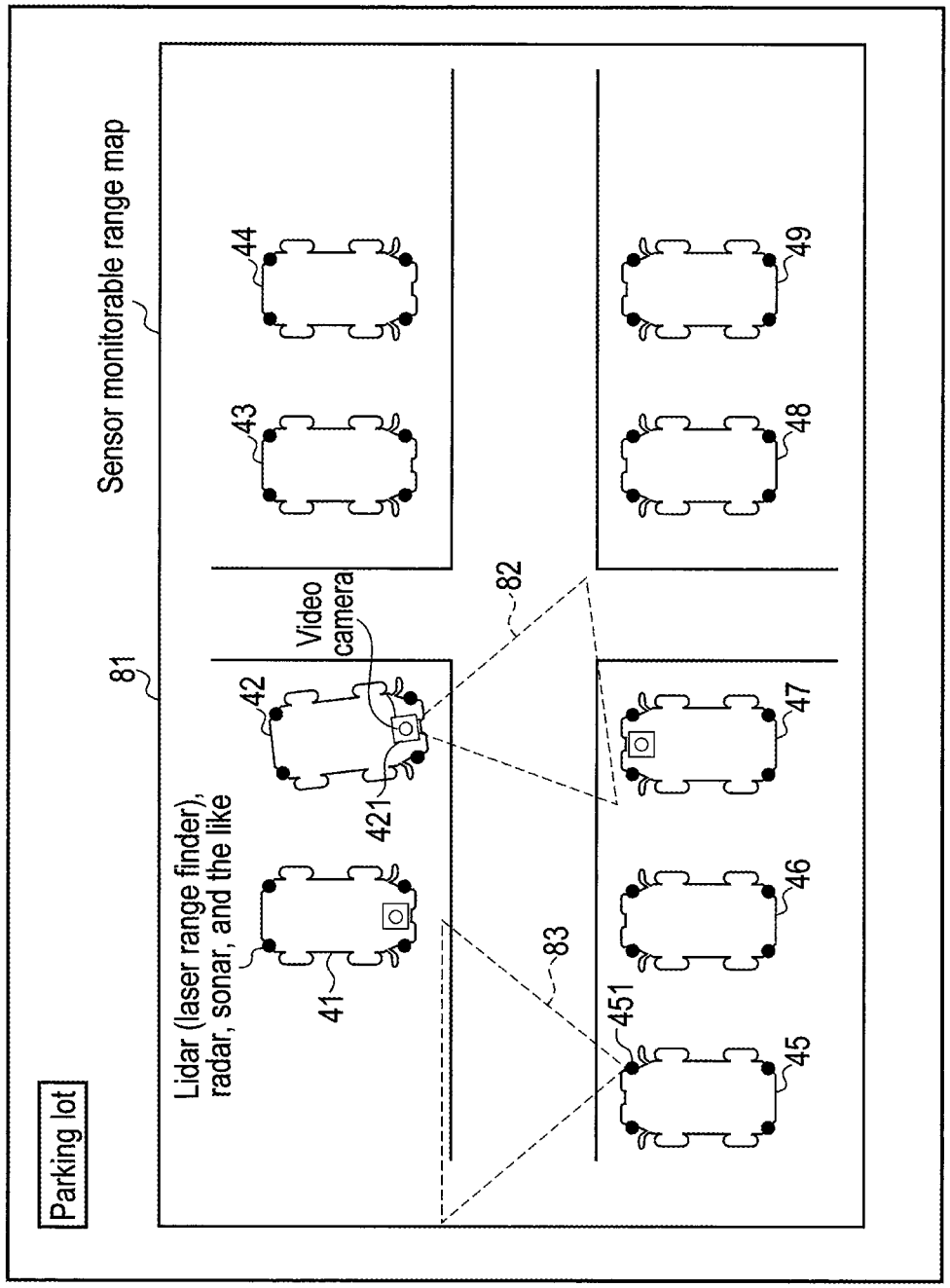
FIG. 15 is a diagram showing an example of a sensor monitorable range map created by the monitor apparatus of the embodiment.

The sensor monitorable range calculation module 503 calculates the sensor monitorable range information 507 by using the moving object information 106. When the sensor monitorable range calculation module 503 calculates the sensor monitorable range information 507, as shown in FIG. 15, the sensor monitorable range calculation module 503 creates a sensor monitorable range map 81 in which the monitorable range of each sensor provided in each of the moving objects is mapped on the monitor region.

The sensor monitorable range calculation module 503 calculates a region 82 on the monitor region corresponding to, for example, the monitorable range of the video camera 421 provided in the vehicle 42. In the sensor monitorable range map 81 for the video camera 421, a value indicating a monitorable region is set in pixels corresponding to this region 82, and a value indicating an unmonitorable region is set in the other pixels. For example, 1 is used as a value indicating the monitorable region. For example, 0 is used as a value indicating that the unmonitorable region. It should be noted that the monitorable range of the video camera 421 is calculated based on, for example, the position and the direction in which the video camera 421 is attached to the vehicle 42, the view angle of the video camera 421, and the like.

The sensor monitorable range calculation module 503 calculates the region 83 on the monitor region corresponding to, for example, the monitorable range of the sensor 451 provided in the vehicle 45. The sensor 451 is, for example, a LIDAR, a radar, a sonar, and the like. In the sensor monitorable range map 81 corresponding to the sensor 451, a value indicating the monitorable region is set in pixels corresponding to this region 83, and a value indicating an unmonitorable region is set in the other pixels. It should be noted that the monitorable range of the sensor 451 is calculated based on, for example, the position and the direction in which the sensor 451 is attached to the vehicle 45, various kinds of specifications of the sensor 451, and the like.

The sensor monitorable range calculation module 503 can generate the sensor monitorable range information 507 including the sensor monitorable range map 81 thus calculated for each sensor provided in the moving object.

The monitoring sensor selection module 504 uses the sensor monitorable range information 507 and the monitor moving object selection information 506 to select at least one sensor from one or more sensors provided in the monitor moving object according to, for example, a standard or rule configured in advance. This standard or rule stipulates that, for example, a LIDAR sensor is selected by default, and high performance cameras and lasers are selected in the case where more useful sensors such as high performance cameras and lasers are provided on the moving object for monitoring. However, this standard or rule is only an example, and it is not limited thereto. The high performance camera is, for example, a camera having a full high vision image quality, six or less imaging elements, 3 million pixels or more as the number of effective pixels of moving pictures, and the like.

Finally, the monitor moving object information communication module 104 performs communication by using the monitor moving object information 107 and the target information 105 (step S204). The monitor moving object information communication module 104 transmits information indicating at least one of the monitor moving object and the monitoring sensor, and the target information 105 indicating the target. The monitor moving object information communication module 104 may transmit such information to all the moving objects in the monitor region or may transmit only the monitor moving object. During this communication, the monitor moving object information communication module 104 transmits a command to turn ON the switch of the monitoring sensor on the monitor moving object by using the information about the monitoring sensor provided in the monitor moving object. The monitor moving object information communication module 104 sets the monitoring sensor on the monitor moving object to the ON state by transmitting, for example, information for setting the monitoring sensor into the ON state, i.e., the operating state, to the monitor moving object. Using the monitoring sensor that is set to the ON state, the specific target to be monitored is monitored by using the information about the position and the moving direction of the target included in the target information 105. The monitor moving object having the monitoring sensor transmits the information acquired through monitoring to the monitor apparatus 1. The monitor moving object information communication module 104 receives, from the monitor moving object, information acquired using the monitoring sensor. The processing circuit of the monitor moving object having the monitoring sensor provided therein may apply specific processing to the data acquired by the monitoring sensor and then transmit the data to the monitor apparatus 1. This specific processing may correspond to a part of processing that can be executed by, for example, the target detection result acquisition module 101, the moving object information acquisition module 102 and the monitor moving object selection module 103.

The monitor moving object information communication module 104 transmits a command for turning OFF the switch of the sensor on the monitor moving object, which was not selected by the monitoring sensor selection module 504 of the monitor moving object selection module 103. The monitor moving object information communication module 104 transmits information for setting, for example, the unselected sensor into the OFF state, i.e., the no-operating state, to the monitor moving object, thus setting the sensor on the monitor moving object into the OFF state.

Further, the monitor moving object information communication module 104 may transmits a command for turning OFF the switches of the sensors provided in the moving object, which is not selected by the monitor moving object selection module 502 of the monitor moving object selection module 103. The monitor moving object information communication module 104 transmits information for setting, for example, the sensor into the OFF state, i.e., the no-operating state, to the moving object, so that the sensor on the moving object can be set into the OFF state.

In a case where a new monitoring sensor and monitor moving object is selected by the monitor moving object selection module 103, the monitor moving object information communication module 104 transmits information indicating the new monitoring sensor and the target information 105 to the new monitor moving object. Then, the monitor moving object information communication module 104 receives the information acquired using the new monitoring sensor from the new monitor moving object. As described above, the monitor moving object information communication module 104 can perform processing to set the monitoring sensor selected by the monitor moving object selection module 103 into the ON state, and set the unselected sensor into the OFF state.

In the case where the target is considered to be about to exit the monitor region, the monitor moving object may transmit information about this target to the monitor apparatus 1. The target detection result acquisition module 101 of the monitor apparatus 1 can acquire new target information 105 using this information and can continue to monitor the target using this new target information 105.

The target is monitored using a sensor having a blind spot in which the target is not included, i.e., a sensor of a moving object capable of monitoring the target. In a case where the target tries to go out of a monitorable range covered by a certain sensor, the monitor moving object having the sensor notifies the monitor apparatus 1 that the target is going out of the monitorable range. In response to this notification, the monitor apparatus 1 can continue monitoring the target by selecting a new moving object or sensor that can monitor the target.

The monitor moving object currently monitoring the target can also adopts the target, which is currently monitored, as the monitored target, and notify the monitor apparatus 1 of the position and the moving direction of the target. The monitor moving object selection module 103 of the monitor apparatus 1 performs reselection of the monitor moving object and monitoring sensor by using the position and the moving direction of the notified target and continues monitoring using the newly selected monitor moving object and monitoring sensor. At this occasion, the target detection result acquisition module 101 specifies the monitored target, i.e., determines which of the targets continuously being monitored it is, and obtains the position and movement information about the monitored target specified. Sensors such as a camera and a LIDAR are used in order to recognize the monitored target and to acquire the position and the moving direction of the target. In the case where a camera is used, the target is detected from the image, and the monitored target is specified by using the position and the ID of the target in the same manner as the method described above. On the other hand, when the LIDAR sensor and the like are used, the target is detected from three-dimensional data by using various already available methods. For example, by using a millimeter wave radar system in a certain technique, the position of the target can be detected in less than 0.1 second. However, since there may be many other moving objects in the surroundings, the position of the already acquired target is used to perform the measurement with the sensor from, for example, the position thereof and the current position estimated from that position, so that the position of the target can be acquired accurately in a short period of time. Likewise, by performing monitoring by using sensors such as a camera and a LIDAR, the target detection result acquisition module 101 and the moving object information acquisition module 102 can acquire the position of the monitor moving object and the position and the moving direction of the target. The target detection result acquisition module 101 maps the target onto the map of the monitor region held in advance by using the information about the position and the moving direction of the target obtained from multiple monitor moving objects, so that the information about the position and the moving direction of the target on the map can be acquired.

The monitor moving object and the monitoring sensor can be selected by using the information about the position and the moving direction of the target, and the above map can be used for the termination determination of monitoring of any given target. In this termination determination, monitoring is determined to be terminated in the case where, for example, it is detected by using the map that the target has gotten out of the monitor region. The information about the position and the moving direction of the target obtained in the above processing is again included in the target information 105.

In the flowchart shown in FIG. 3, for example step S201 and step S202 may not be necessarily executed in this order.

The monitor apparatus 1 can monitor the target not only in the above parking lot but also at the intersection and its vicinity as shown in FIG. 16 to FIG. 19. The monitor apparatus 1 can perform monitoring in any location not limited thereto.

Figure 17:
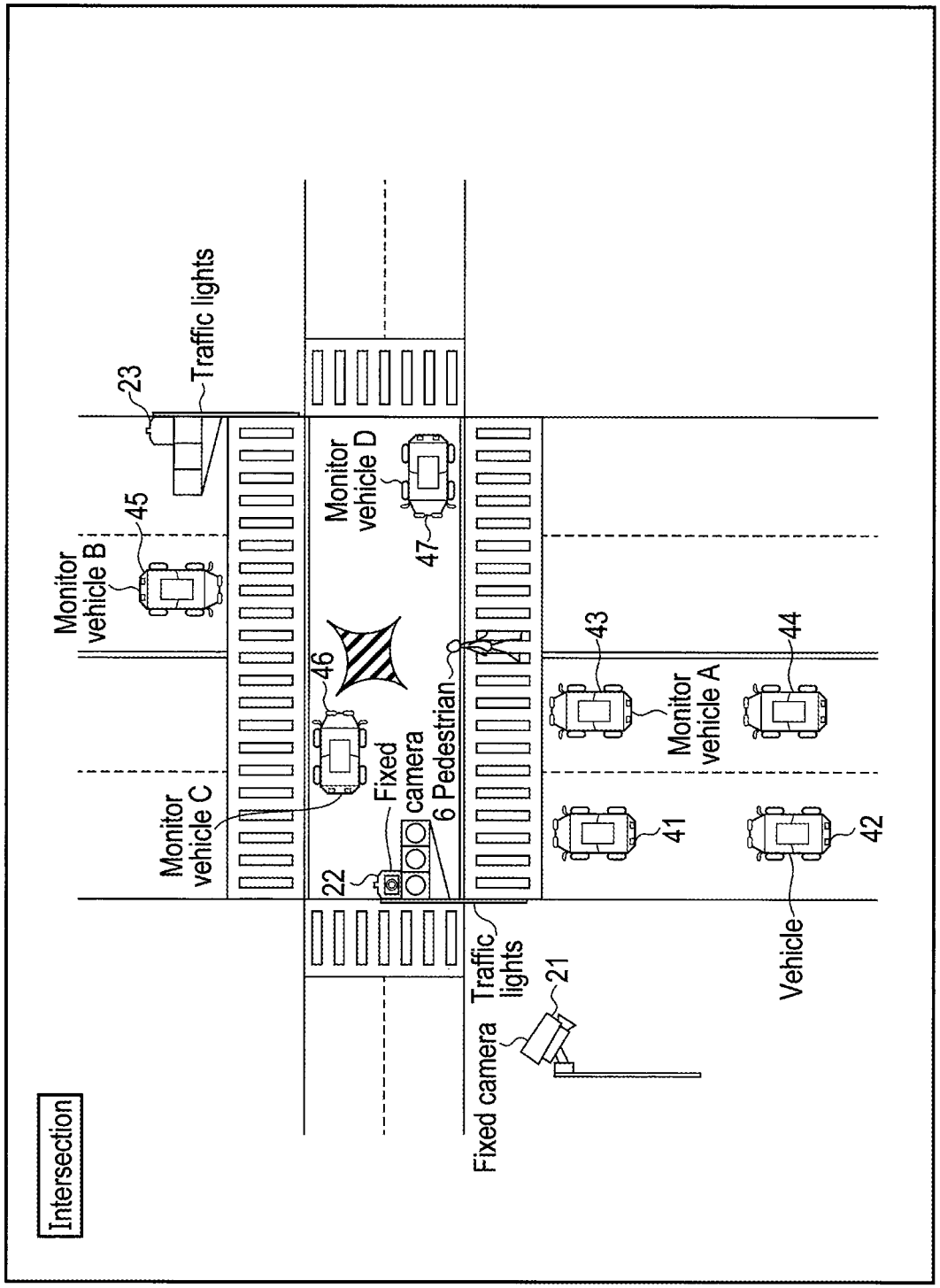
FIG. 17 is a diagram for explaining another example of an environment monitored by the monitor apparatus of the embodiment, in which a monitor region is an intersection, and a target is a pedestrian crossing a road at a crosswalk.

FIG. 16 and FIG. 17 show an example in which a pedestrian 6 traversing a crosswalk at an intersection is monitored by the monitor apparatus 1.

In the example shown in FIG. 16, three fixed cameras 21, 22, and 23 are installed at the intersection, and vehicles 41 to 45, which are moving objects, are at a stop. Like the example of the parking lot explained above, the target detection result acquisition module 101 acquires the target information 105 indicating the position and the moving direction of the pedestrian 6. The moving object information acquisition module 102 acquires the moving object information 106 indicating the positions of the vehicles 41 to 45 and one or more sensors provided in each of the vehicles 41 to 45.

The monitor moving object selection module 103 selects the monitor moving objects 43, 44 and 45 for monitoring the pedestrian 6 from the vehicles 41 to 45 based on the target information 105 and moving object information 106 which have been acquired. For example, the monitor moving object selection module 103 selects the vehicles 43 and 44 whose distances are close from the pedestrian 6 based on the distance between the pedestrian 6 and each of the vehicles 41 to 45. The monitor moving object selection module 103 also selects, based on the moving direction of pedestrian 6, the vehicle 45 which is considered to be approaching as a result of the movement. The monitor moving object selection module 103 selects a monitoring sensor for monitoring the pedestrian 6 from one or more sensors provided in each of these monitor moving objects 43, 44 and 45.

The monitor moving object information communication module 104 transmits the monitor moving object information 107 indicating the selected monitoring sensor and the target information 105 indicating the pedestrian 6 to the monitor moving objects 43, 44 and 45, and receives the data acquired using the monitoring sensor from each of these monitor moving objects 43, 44 and 45. Then, the target detection result acquisition module 101 can acquire new target information 105 by using the received data.

In the example shown in FIG. 17, three fixed cameras 21, 22 and 23 are installed at the intersection, and vehicles 41 to 47 which are moving objects are either at a stop or running. The target detection result acquisition module 101 acquires the target information 105 indicating the position and the moving direction of the pedestrian 6. The moving object information acquisition module 102 acquires the moving object information 106 indicating the positions of the vehicles 41 to 47 and one or more sensors provided in each of the vehicles 41 to 47. The monitor moving object selection module 103 selects the monitor moving objects 43, 45, 46, and 47 for monitoring the pedestrian 6 from the vehicles 41 to 47 based on the target information 105 and moving object information 106 which have been acquired. The monitor moving object selection module 103 then selects a monitoring sensor for monitoring the pedestrian 6 from one or more sensors provided in each of the monitor moving objects 43, 45, 46, and 47. The monitor moving object information communication module 104 transmits the monitor moving object information 107 indicating the selected monitoring sensor and the target information 105 indicating the pedestrian 6 to the monitor moving objects 43, 45, 46, and 47, and receives the data acquired using the monitoring sensor from each of these monitor moving objects 43, 45, 46, and 47. Then, the target detection result acquisition module 101 can acquire new target information 105 by using the received data.

By using the acquired target recognition information 3013, the target can be monitored, and the monitor vehicle and the monitoring sensor can be reselected.

Figure 18:
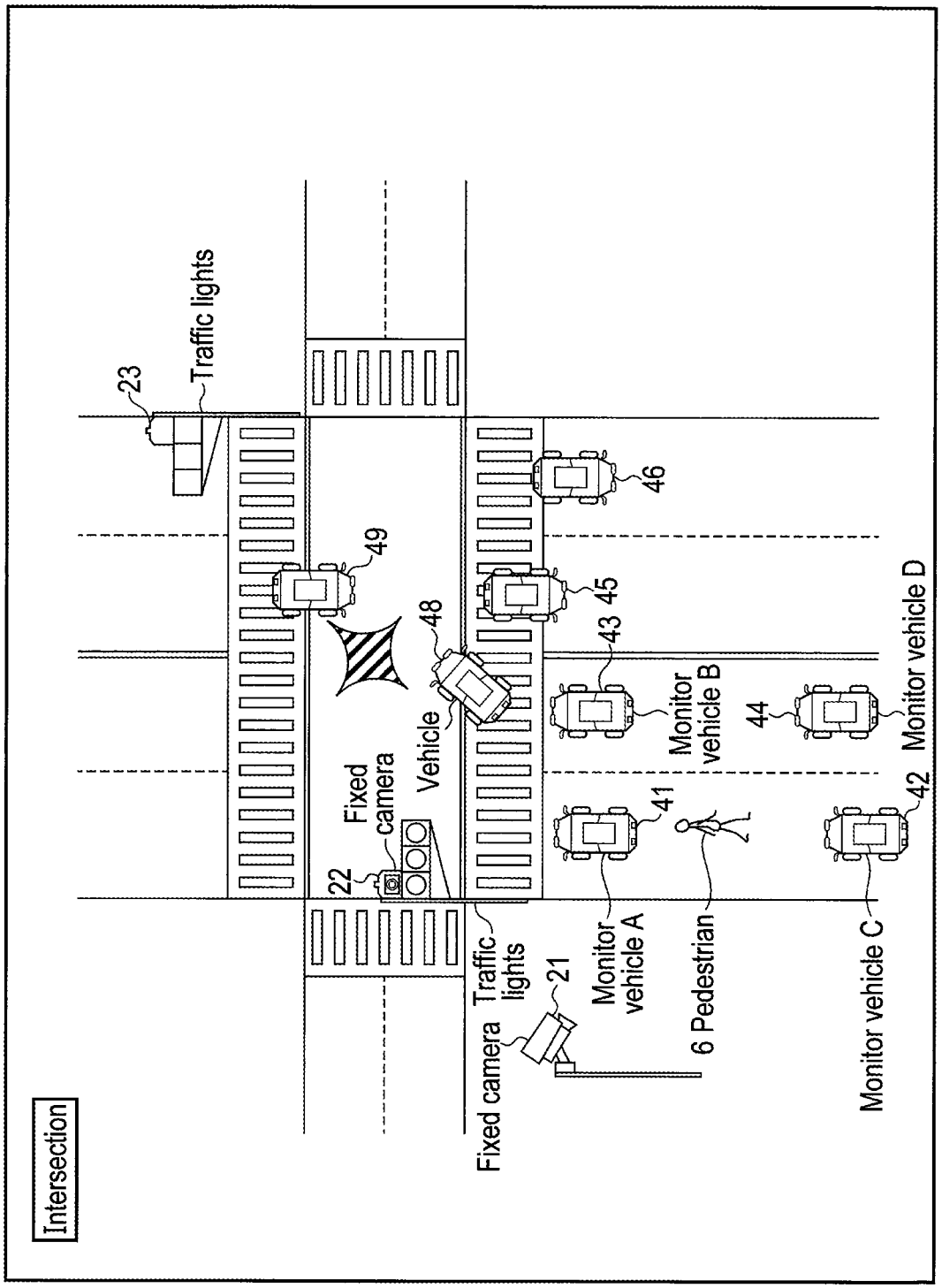
FIG. 18 is a diagram for explaining an example of an environment monitored by the monitor apparatus of the embodiment, in which a monitor region is an intersection, and a target is a pedestrian crossing a road at a location other than a crosswalk.
Figure 19:
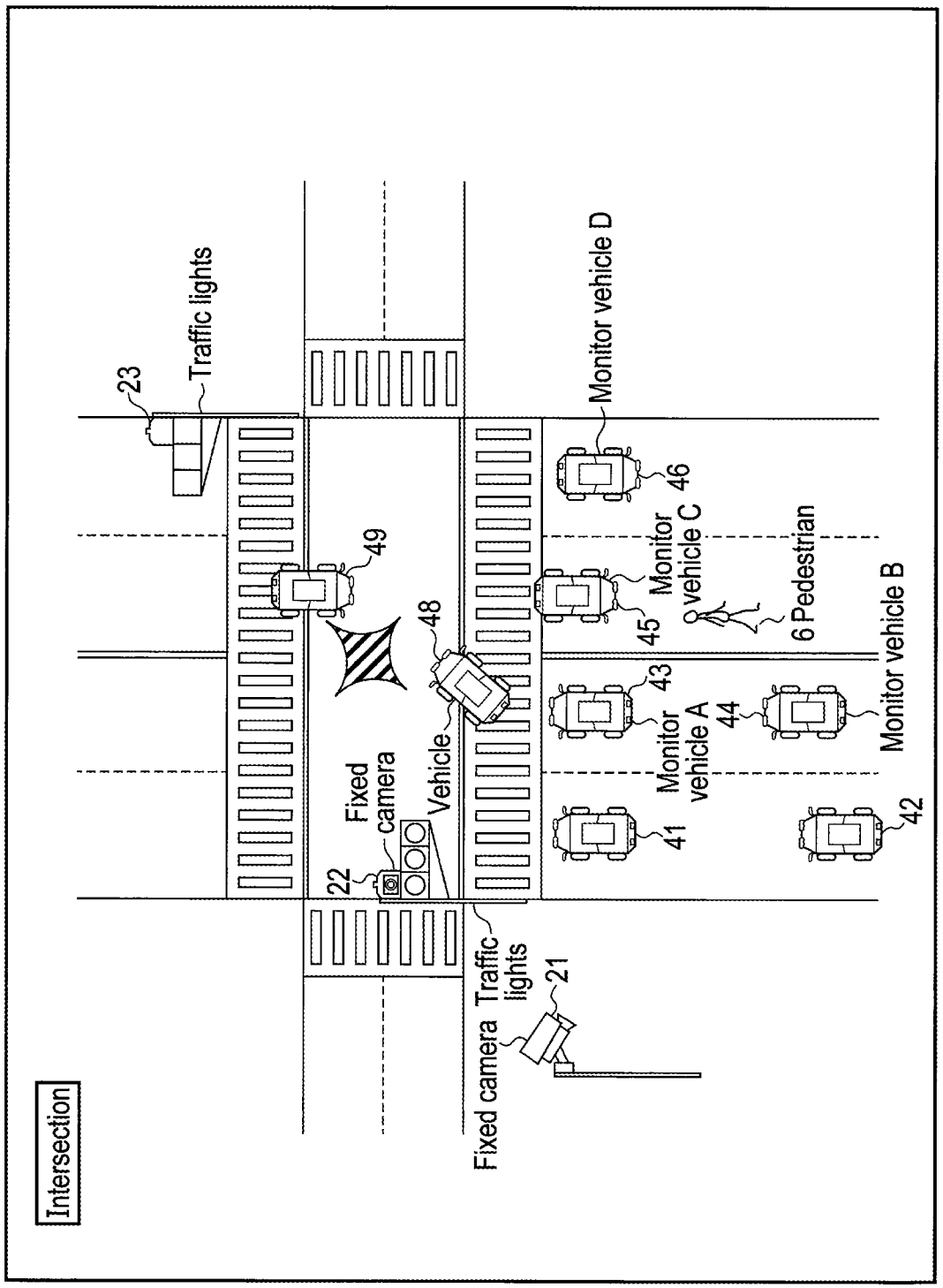
FIG. 19 is a diagram for explaining another example of an environment monitored by the monitor apparatus of the embodiment, in which a monitor region is an intersection, and a target is a pedestrian crossing a road at a location other than a crosswalk.

Subsequently, FIG. 18 and FIG. 19 show an example in which the pedestrian 6 traversing a non-crosswalk location near the intersection is monitored by the monitor apparatus 1.

In the example shown in FIG. 18, three fixed cameras 21, 22 and 23 are installed at the intersection, and vehicles 41 to 46, 48, and 49 which are moving objects are at a stop or running. The target detection result acquisition module 101 acquires the target information 105 indicating the position and the moving direction of the pedestrian 6. The moving object information acquisition module 102 acquires the moving object information 106 indicating the position of the vehicles 41 to 46, 48, and 49 and one or more sensors provided in each of the vehicles 41 to 46, 48, and 49.

The monitor moving object selection module 103 selects the monitor moving objects 41, 42, 43, and 44 for monitoring the pedestrian 6 from the vehicles 41 to 46, 48, and 49 based on the target information 105 and the moving object information 106 which have been acquired. The monitor moving object selection module 103 selects the vehicles 41 and 42 of which distances are close from the pedestrian 6 based on, for example, the distance between pedestrian 6 and each of the vehicles 41 to 46, 48 and 49. The monitor moving object selection module 103 also selects, based on the moving direction of the pedestrian 6, the vehicles 43, 44 which are considered to approach as a result of the movement. The monitor moving object selection module 103 selects a monitoring sensor for monitoring the pedestrian 6 from one or more sensors provided in each of these monitor moving objects 41, 42, 43, and 44.

The monitor moving object information communication module 104 transmits the monitor moving object information 107 indicating the selected monitoring sensor and the target information 105 indicating the pedestrian 6 to the monitor moving objects 41, 42, 43, and 44, and receives the data acquired using the monitoring sensor from each of these monitor moving objects 41, 42, 43, and 44. Then, the target detection result acquisition module 101 can acquire new target information 105 by using the received data.

In the example shown in FIG. 19, three fixed cameras 21, 22, and 23 are installed at the intersection and vehicles 41 to 46, 48, and 49 which are moving objects are at a stop or running. The target detection result acquisition module 101 acquires the target information 105 indicating the position and the moving direction of the pedestrian 6. The moving object information acquisition module 102 acquires the moving object information 106 indicating the positions of the vehicles 41 to 46, 48, and 49 and one or more sensors provided in each of the vehicles 41 to 46, 48, and 49. The monitor moving object selection module 103 selects the monitor moving objects 43, 44, 45, and 46 for monitoring the pedestrian 6 from the vehicles 41 to 46, 48, and 49 based on the target information 105 and moving object information 106 which have been acquired. The monitor moving object selection module 103 also selects a monitoring sensor for monitoring the pedestrian 6 from one or more sensors provided in each of the monitor moving objects 43, 44, 45, and 46. The monitor moving object information communication module 104 transmits the monitor moving object information 107 indicating the selected monitoring sensor and the target information 105 indicating the pedestrian 6 to the monitor moving objects 43, 44, 45, and 46, and receives the data acquired using the monitoring sensor from each of these monitor moving objects 43, 44, 45, and 46. Then, the target detection result acquisition module 101 can acquire new target information 105 by using the received data.

By using the newly acquired target information 105 as described above, the target can be monitored, and the monitor vehicle and the monitoring sensor can be reselected.

As explained above, according to the present embodiment, the moving target can be sufficiently monitored in the environment where the blind spot dynamically changes. The target detection result acquisition module 101 acquires the target information (first information) 105 indicating the position and the moving direction of the target. The moving object information acquisition module 102 acquires moving object information (second information) 106 indicating the positions of moving objects and sensors provided in each of the moving objects. The monitor moving object selection module 103 selects at least one of the first moving object for monitoring the target from among the moving objects and the first sensor for monitoring the target from among the sensors explained above based on the target information 105 and moving object information 106. The monitor moving object information communication module 104 transmits monitor moving object information 107 indicating at least one of the first moving object and the first sensor and the target information 105 (third information) indicating the target.

Therefore, the monitor apparatus 1 can monitor the target by using the data acquired by the sensor that is provided in the first moving object or the first sensor, and can reselect a moving object and a monitoring sensor for monitoring the target by using the newly obtained target information 105. Therefore, for example, even at a location where the blind spot dynamically changes and it is difficult to perform monitoring with only the fixed cameras, the target can be reliably monitored by using the sensor of the moving object appropriately selected based on the target information 105 and the moving object information 106.

[Modification]

A modification of the present embodiment will be described. In contrast to the above embodiment in which the monitor moving object is selected and thereafter the monitoring sensor is selected from among the sensors provided in the monitor moving object, the present modification is different in that a monitoring sensor used for monitoring the target is determined and thereafter a moving object in which the monitoring sensor is provided is selected as the monitor moving object. The overall configuration of the present modification is similar to that of the above-described embodiment, and therefore, the monitor moving object selection module 103 having a different configuration will be described with reference to FIG. 20. The monitor moving object selection module 103 includes, for example, a monitor region calculation module 501, a sensor monitorable range calculation module 503 and a monitor moving object selection module 502.

The monitor region calculation module 501 calculates the monitor region information 505 using the target information 105 and sends the monitor region information 505 to the sensor monitorable range calculation module 503. The sensor monitorable range calculation module 503 acquires sensor monitorable range information 507 by using the monitor region information 505 and moving object information 106, and sends the sensor monitorable range information 507 to the monitor moving object selection module 502.

The monitor moving object selection module 502 selects the monitoring sensor by using the sensor monitorable range information 507. The monitor moving object selection module 502 previously acquires a sensor monitorable range map 81 as shown in, for example, FIG. 15. The monitor moving object selection module 502 then selects a sensor capable of monitoring the target in the sensor monitorable range map 81 in view of the monitor region information 505 and the position and the moving direction of the target in the target information 105. More specifically, the monitor moving object selection module 502 determines whether each sensor can monitor the target or not based on whether a target is present within the range which each sensor can monitor based on the position on the sensor monitorable range map 81 where the target is present. Like the embodiment explained above, for example, in view of the moving direction of the target, the monitor moving object selection module 502 may select, as the monitoring sensor, a sensor that can monitor the position where the target is considered to be present after a certain period of time (for example, several seconds) have elapsed.

Then, the monitor moving object selection module 502 selects, as the monitor moving object, the moving object in which the selected monitoring sensor is provided, and sends the monitor moving object information 107 indicating the monitor moving object and monitoring sensor, which have been selected, to the monitor moving object information communication module 104. The monitor moving object information communication module 104 transmits the target information 105 and the monitor moving object information 107 indicating at least one of the monitor moving object and the monitoring sensor.

As described above, according to the present modification, the monitoring sensor for monitoring the target is selected from the sensors which are present in the monitor region, and thereafter, the moving object in which the sensor is provided is selected. Therefore, the moving object information 107 indicating the monitor moving object and the monitoring sensor can be acquired.

Each of various functions described in the present embodiment may be realized with processing circuitry. An example of processing circuitry includes a programmed processor such as a central processing unit (CPU). This processor executes each of the described functions by executing the instructions corresponding to the computer program stored in the memory. The processor may be a microprocessor including an electrical circuit. Examples of processing circuits include digital signal processors (DSPs), application specific integrated circuits (ASICs), microcontrollers, controllers, and other electrical circuit components.

Each of the components other than the CPU described in the present embodiment may also be realized with processing circuitry.

Since various kinds of processing of the present embodiment can be realized with a computer program, the same effects as those of the present embodiment can be easily realized by just installing the computer program to the computer by way of a computer readable storage medium storing the computer program and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A monitor apparatus comprising:
   a memory; and
   processing circuitry configured to:
   acquire first information indicating a position and a moving direction of a target;
   acquire second information indicating a position of each of moving objects and sensors which are provided in the moving objects;
   select at least one of a first moving object for monitoring the target from among the moving objects or a first sensor for monitoring the target from among the sensors, based on the first information and the second information; and
   transmit third information indicating the target and at least one of the first moving object or the first sensor,
   wherein the processing circuitry is further configured to:
   record a number of times each of the moving objects or the sensors is selected by the processing circuitry; and
   select at least one of the first moving object from among the moving objects or the first sensor from among the sensors based on at least one of the number of times or a battery level of each of the moving objects.

2. The monitor apparatus of claim 1, wherein
the processing circuitry is further configured to receive fourth information obtained by a sensor provided in the first moving object or the first sensor.

3. The monitor apparatus of claim 2, wherein
the processing circuitry is further configured to:
   acquire the first information based on an image captured by a camera; and
   calculate a position and a moving direction of the target based on the fourth information.

4. The monitor apparatus of claim 2, wherein
the processing circuitry is further configured to:
   calculate a position and a moving direction of the target based on the fourth information;
   select at least one of a second moving object for monitoring the target from among the moving objects or a second sensor for monitoring the target from among the sensors, based on the calculated position and moving direction of the target; and
   transmit information indicating the target and at least one of the second moving object or the second sensor.

5. The monitor apparatus of claim 1, wherein
the processing circuitry is further configured to transmit, to the first moving object, information for setting the sensor provided in the first moving object or the first sensor into an ON state.

6. The monitor apparatus of claim 5, wherein
the processing circuitry is further configured to:
   transmit, to the first moving object, information for setting a sensor not selected by the processing circuitry into an OFF state; and
   transmit, to a second moving object, information for setting, into an OFF state, a sensor provided in the second moving object which is not selected by the processing circuitry.

7. The monitor apparatus of claim 1, wherein
the processing circuitry is further configured to:
   select, from the moving objects which are present in a first region, one or more moving objects which are present in a second region where the target is present, wherein the second region is a part of the first region; and
   select the first moving object for monitoring the target from the selected one or more moving objects, based on the first information and the second information.

8. A monitor system comprising a monitor apparatus, at least one fixed camera and moving objects, wherein
the monitor apparatus is configured to:
   acquire first information indicating a position and a moving direction of a target based on an image captured by the at least one fixed camera;
   acquire second information indicating a position of each of the moving objects and sensors which are provided in the moving objects;
   select at least one of a first moving object for monitoring the target from among the moving objects or a first sensor for monitoring the target from among the sensors, based on the first information and the second information; and
   transmit third information indicating the target and at least one of the first moving object or the first sensor,
   wherein the monitor apparatus is further configured to:
   record a number of times each of the moving objects or the sensors is selected by the monitor apparatus; and
   select at least one of the first moving object from among the moving objects or the first sensor from among the sensors based on at least one of the number of times or a battery level of each of the moving objects.

9. The monitor system of claim 8, wherein
the monitor apparatus is further configured to receive fourth information obtained by a sensor provided in the first moving object or the first sensor.

10. The monitor system of claim 9, wherein
the monitor apparatus is further configured to:
    acquire the first information based on an image captured by the at least one fixed camera; and
    calculate a position and a moving direction of the target based on the fourth information.

11. The monitor system of claim 9, wherein
the monitor apparatus is further configured to:
    calculate a position and a moving direction of the target based on the fourth information;
    select at least one of a second moving object for monitoring the target from among the moving objects or a second sensor for monitoring the target from among the sensors, based on the calculated position and moving direction of the target; and transmit information indicating the target and at least one of the second moving object or the second sensor.

12. The monitor system of claim 8, wherein
the monitor apparatus is further configured to transmit, to the first moving object, information for setting the sensor provided in the first moving object or the first sensor into an ON state.

13. A method comprising:
acquiring first information indicating a position and a moving direction of a target;
acquiring second information indicating a position of each of moving objects and sensors which are provided in the moving objects;
selecting at least one of a first moving object for monitoring the target from among the moving objects or a first sensor for monitoring the target from among the sensors, based on the first information and the second information; and
transmitting third information indicating the target and at least one of the first moving object or the first sensor,
wherein the method further comprises:
recording a number of times each of the moving objects or the sensors is selected; and
selecting at least one of the first moving object from among the moving objects or the first sensor from among the sensors based on at least one of the number of times or a battery level of each of the moving objects.

14. The method of claim 13, further comprising:
receiving fourth information obtained by a sensor provided in the first moving object or the first sensor.

15. The method of claim 14, further comprising:
acquiring the first information based on an image captured by a fixed camera; and
calculating a position and a moving direction of the target based on the fourth information.

16. The method of claim 14, further comprising:
calculating a position and a moving direction of the target based on the fourth information;
selecting at least one of a second moving object for monitoring the target from among the moving objects or a second sensor for monitoring the target from among the sensors, based on the calculated position and moving direction of the target; and
transmitting information indicating the target and at least one of the second moving object or the second sensor.

17. The method of claim 13, further comprising:
transmitting, to the first moving object, information for setting the sensor provided in the first moving object or the first sensor into an ON state.

* * * * *